United States Patent
Van De Moortele (12)

(10) Patent No.: US 6,287,457 B1
(45) Date of Patent: Sep. 11, 2001

(54) WATER TREATMENT DEVICE HAVING VOLUMETER DRIVEN MONITORING DISCS

(75) Inventor: Guido Ivo Cesar Maria Van De Moortele, Antwerp (BE)

(73) Assignee: Padema, Naamloze Vennootschap, Antwerp (BE)

( * ) Notice: Subject to any disclaimer, the term of this patent is extended or adjusted under 35 U.S.C. 154(b) by 0 days.

(21) Appl. No.: 09/147,591

(22) Filed: Jan. 28, 1999

(30) Foreign Application Priority Data

Jul. 29, 1996 (BE) .................................................. 9600663

(51) Int. Cl.[7] ...................................................... B01J 47/14
(52) U.S. Cl. ............................. 210/88; 210/98; 210/142; 210/275; 137/624.14; 137/624.18
(58) Field of Search ................................ 210/88, 98, 134, 210/135, 190, 141, 142, 275; 137/624.12, 624.14, 624.18

(56) References Cited

U.S. PATENT DOCUMENTS

| | | | |
|---|---|---|---|
| 1,955,694 | * | 4/1934 | Turner .................................... 210/88 |
| 2,354,694 | * | 8/1944 | McGill et al. .......................... 210/88 |
| 2,993,508 | * | 6/1961 | Wagner ................................. 137/869 |
| 3,509,998 | * | 5/1970 | Pellett ................................... 210/98 |
| 3,570,520 | * | 3/1971 | Sodi ..................................... 137/110 |
| 4,298,025 | * | 11/1981 | Prior et al. ...................... 137/624.14 |
| 4,539,106 | * | 9/1985 | Schwartz ............................... 210/88 |
| 5,022,994 | * | 6/1991 | Avery et al. ......................... 210/670 |

FOREIGN PATENT DOCUMENTS

| | | |
|---|---|---|
| 1 517 483 | 12/1969 | (DE) . |
| 2 001 516 | 10/1970 | (DE) . |
| 2 060 751 | 6/1972 | (DE) . |
| 2 131 117 | 1/1973 | (DE) . |
| 2 319 343 | 11/1974 | (DE) . |
| 23 39 539 | 2/1975 | (DE) . |
| 26 52 113 A | 5/1978 | (DE) . |
| 42 27 135 A | 2/1994 | (DE) . |
| 0 219 704 A | 4/1987 | (EP) . |
| 2 223 609 | 10/1974 | (FR) . |
| 7114100 | 4/1973 | (NL) . |
| 94/13379 | 6/1994 | (WO) . |

* cited by examiner

*Primary Examiner*—Ana Fortuna
*Assistant Examiner*—Richard W. Ward
(74) *Attorney, Agent, or Firm*—Bacon & Thomas

(57) ABSTRACT

A water treatment device wherein the water during treating is brought into contact with a treatment medium (29), whereby this treatment medium (29), either by means of a regeneration medium (42) or not, is regenerated regularly and whereby, a regulator (59) is used which is provided, with a hydraulically driven first monitoring mechanism (24) with which the water consumption can be controlled and the start of the regeneration cycle can be ordered, and with a hydraulically driven second monitoring mechanism (25) with which the regeneration cycle is controlled and characterized in that both monitoring mechanisms (24–25) are driven by means of the same volumeter (23).

14 Claims, 24 Drawing Sheets

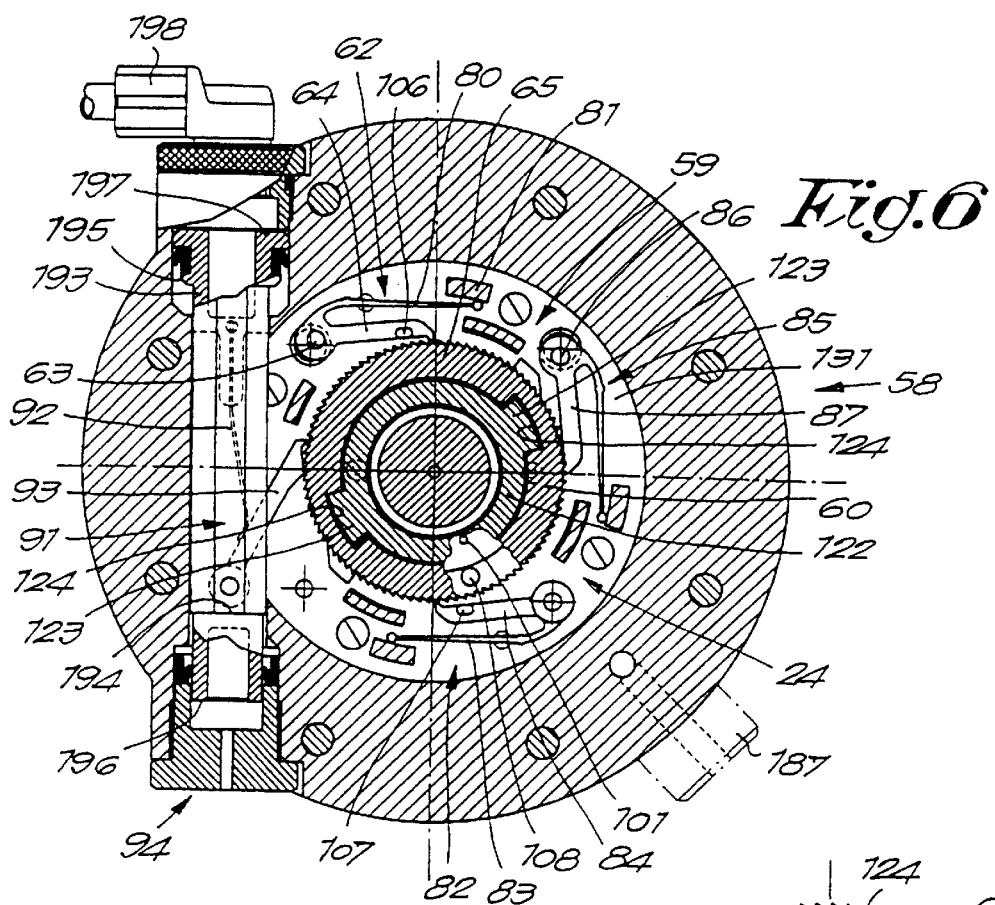
Fig.6
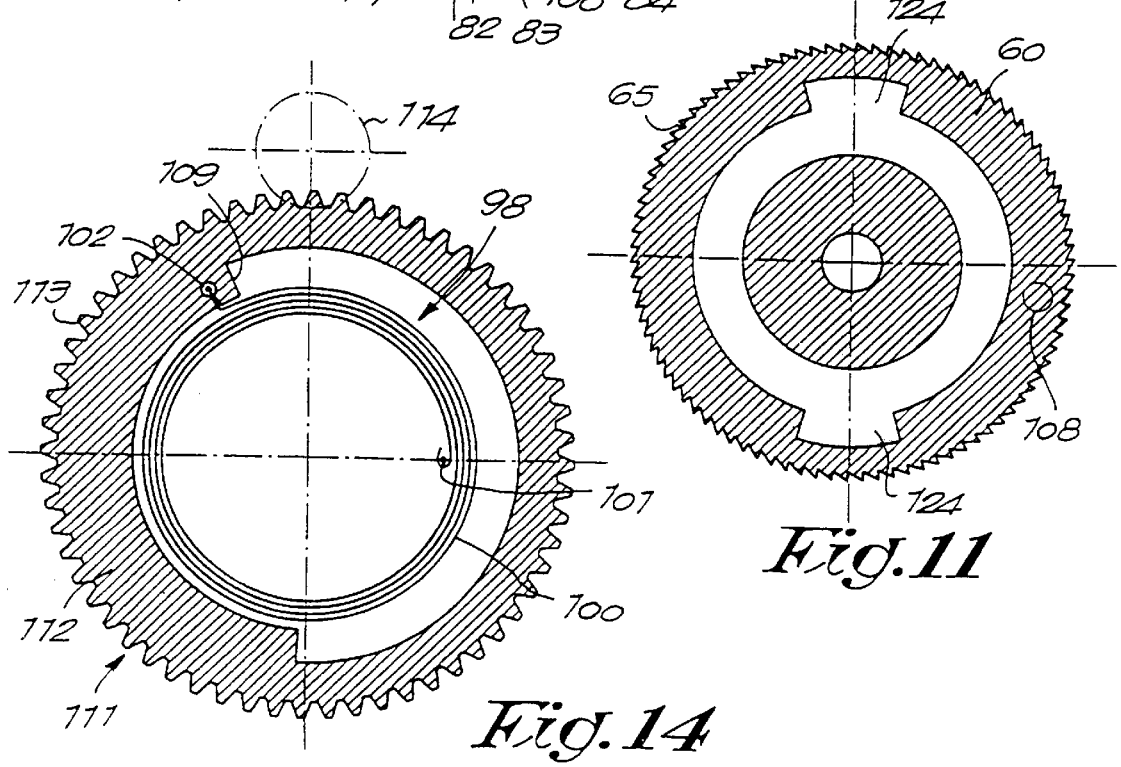
Fig.14
Fig.11

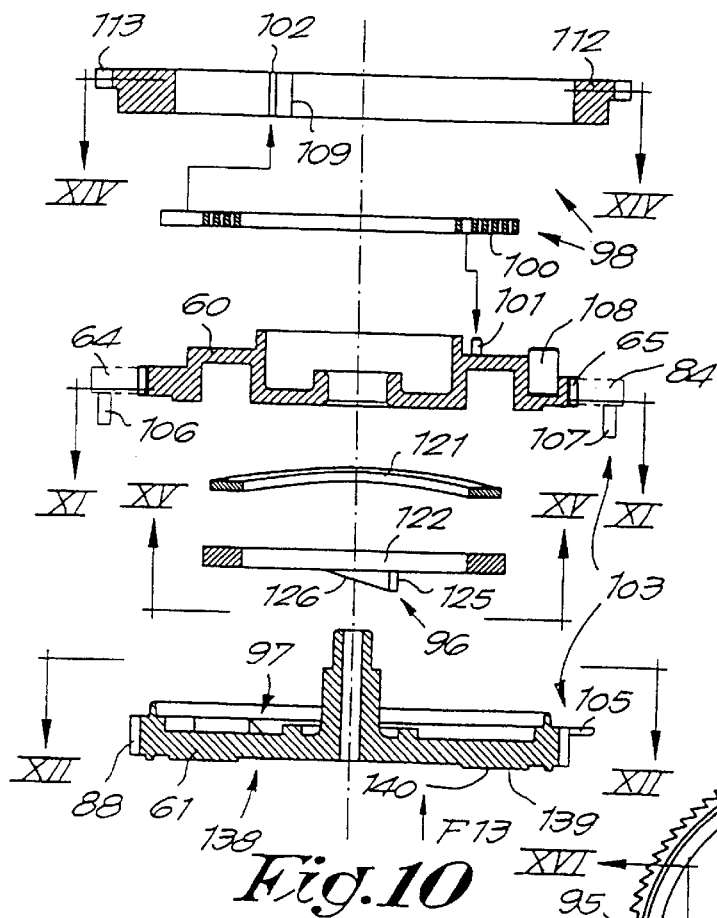
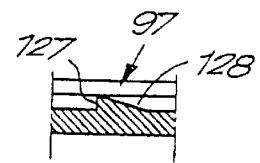
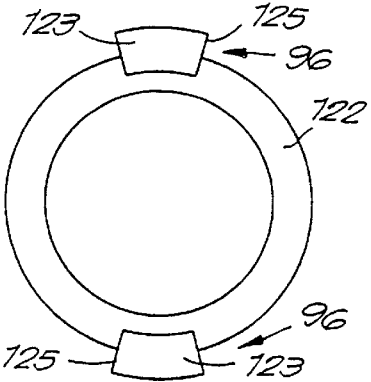
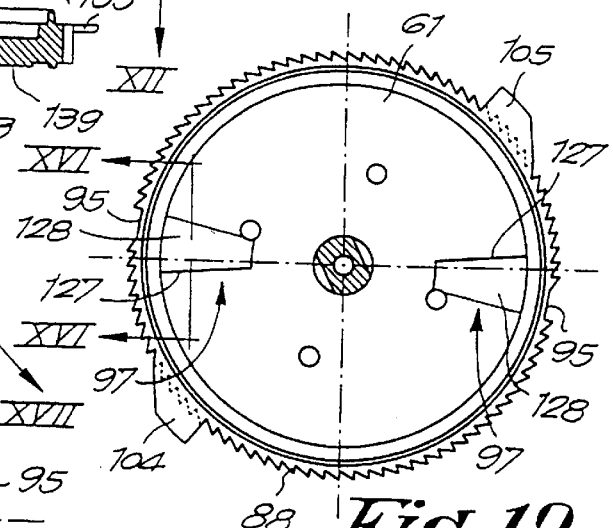
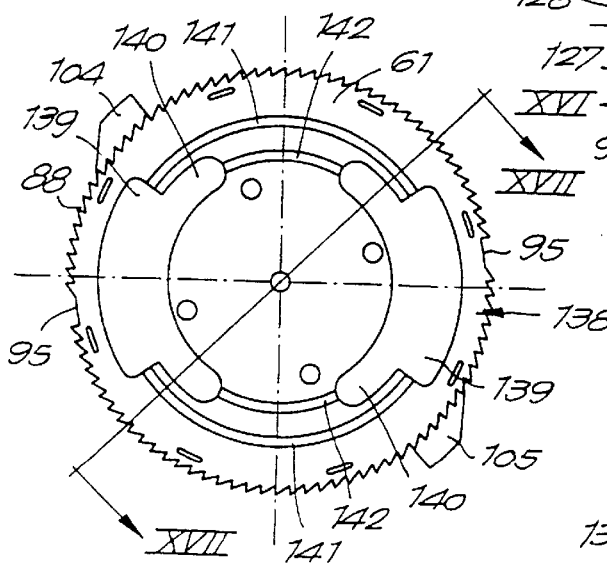
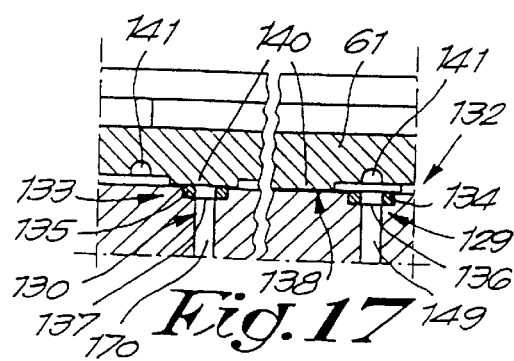

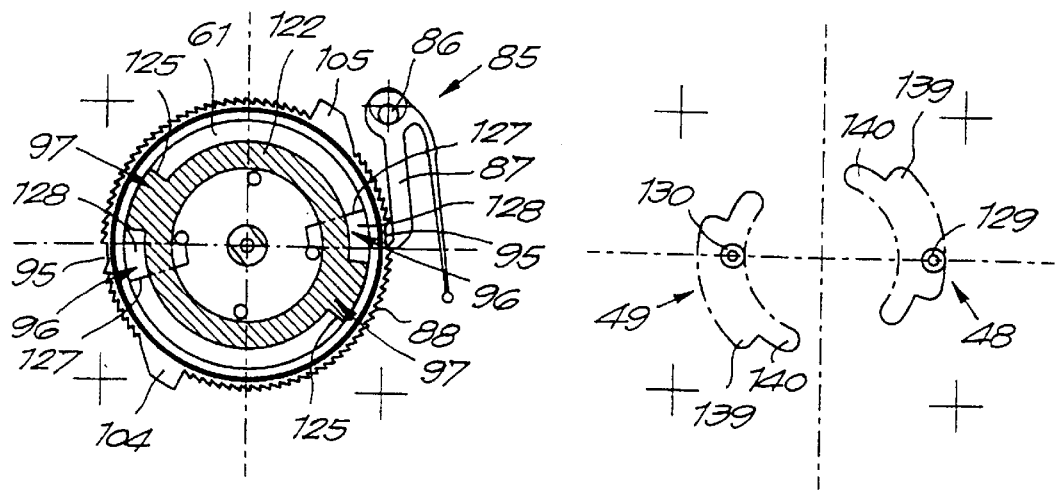
*Fig.24*  *Fig.25*
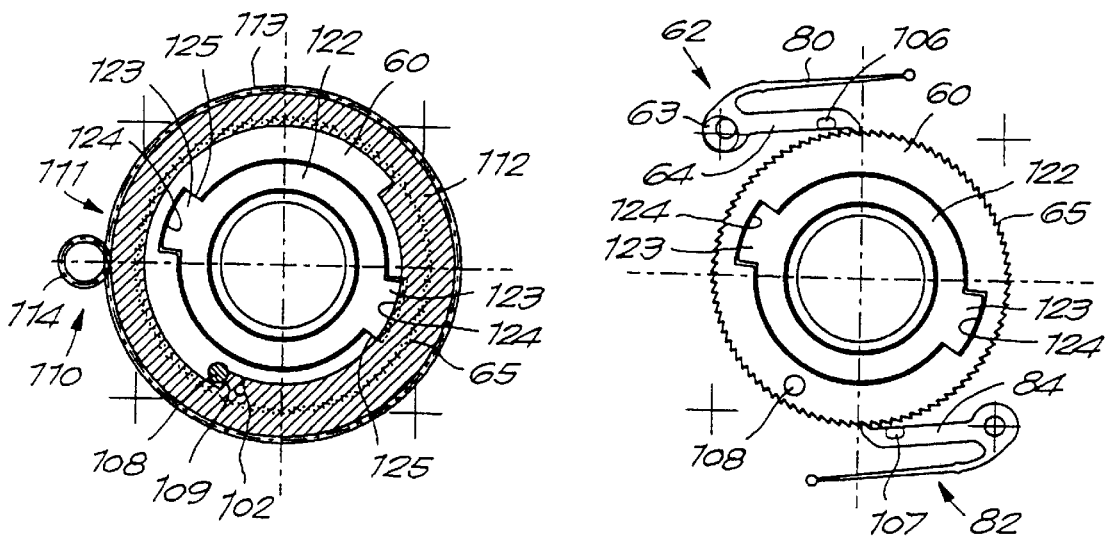
*Fig.26*  *Fig.27*

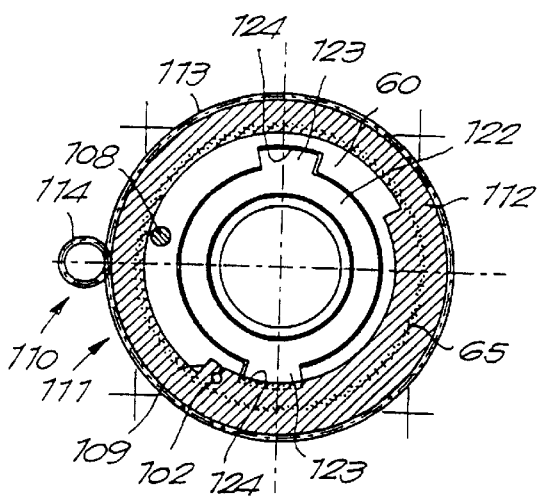
Fig.29
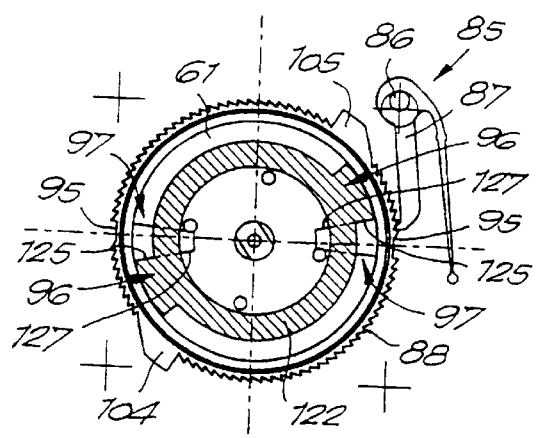
Fig.30
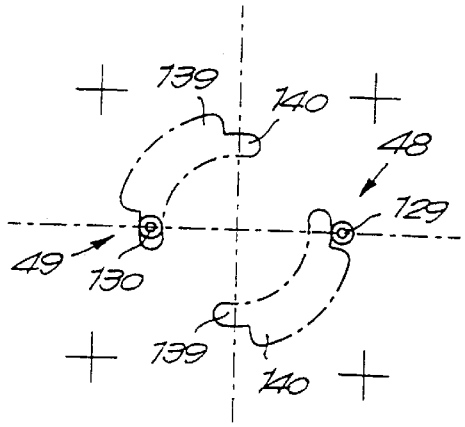
Fig.31
Fig.33
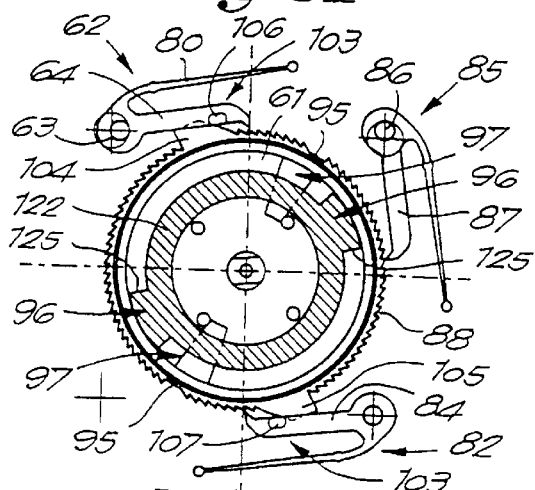
Fig.35
Fig.36

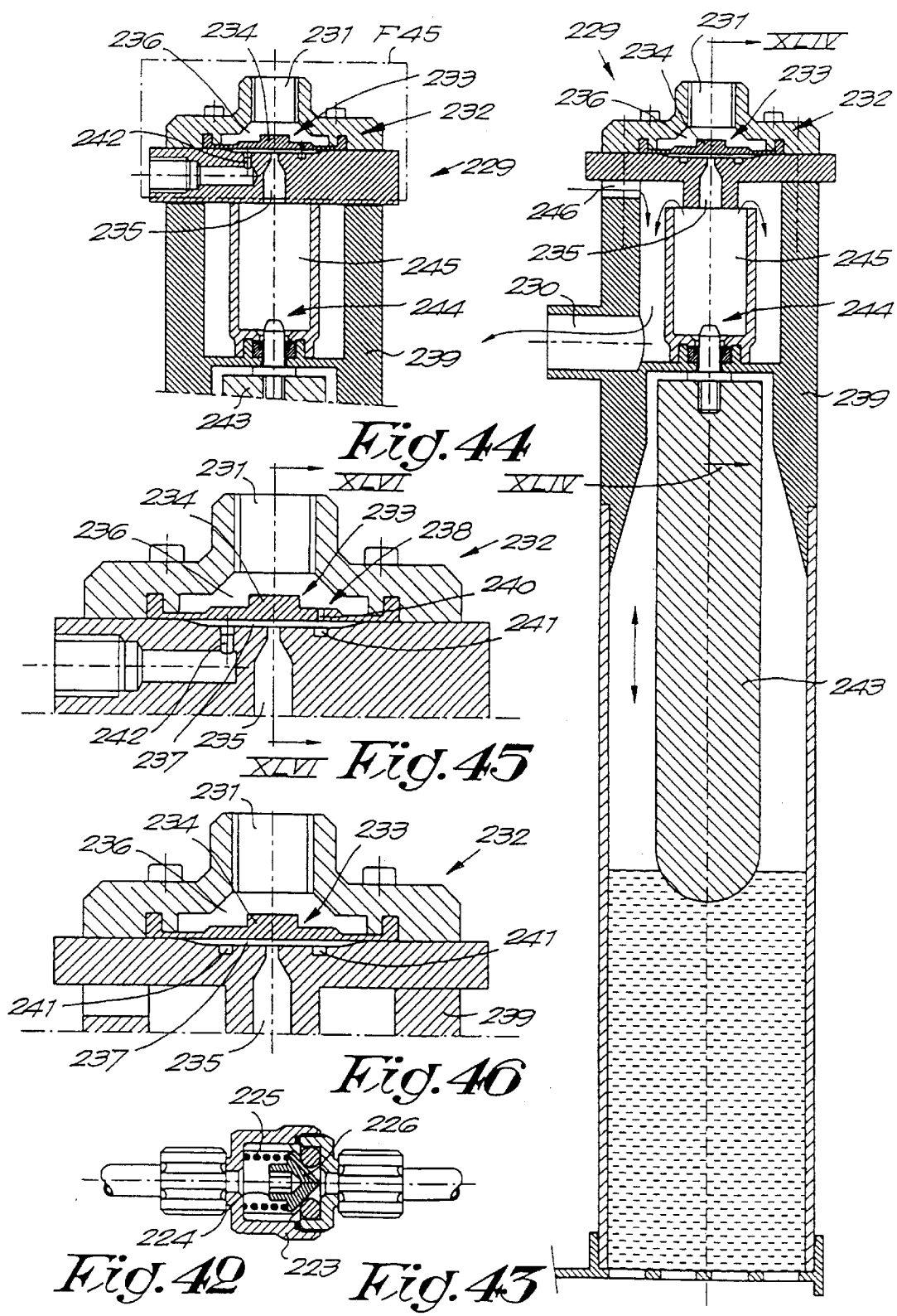

WATER TREATMENT DEVICE HAVING VOLUMETER DRIVEN MONITORING DISCS

This invention relates to a water treatment device, more particularly of the type whereby the water during treating is brought into contact with a treatment medium, whereby this treatment medium is rinsed regularly or regularly regenerated by means of a regeneration medium.

In the first place, water softeners are intended hereby, the invention, however, does not exclude other applications in which other treatments are performed.

It is known that such water treatment devices are equipped with a regulator which provides for the regular performance of an automatic regeneration.

Two types of regulators are known, electrically actuated regulators and hydraulically actuated regulators, respectively. The electrical type shows the disadvantage that it is very expensive. Another disadvantage consists in that such regulator requires the availability of an electric supply.

The invention substantially relates to the hydraulically actuated type of regulators, which do not show the above-mentioned disadvantages.

In the hydraulically actuated type, in order to perform such regeneration, it is known to provide such regulator with a hydraulically driven monitoring mechanism with which the water consumption is controlled and the start of the regeneration cycle can be ordered, and, on the other hand, with a hydraulically driven second monitoring mechanism with which the regeneration cycle is controlled. To this aim, use is made of two volumeters which respectively provide for the drive of the two monitoring mechanisms. Such a device is, among others, described in U.S. Pat. No. 3,891,552.

An inconvenience of these known regulators consists in that they are rather complicated, among others, because various volumeters are necessary.

Apart from the aforementioned American patent U.S. Pat. No. 3,891,552, other, less relevant water treatment devices and related technologies are known from the American patents:

U.S. Pat. Nos. 2,024,479, 3,136,331, 3,164,550, 3,302,467, 3,396,845, 3,454,492, 3,509,998, 3,570,520, 3,792,614, 3,960,721, 4,026,673, 4,089,220, 4,298,025, 4,313,825, 4,336,134, 4,337,153, 4,539,106, 4,577,498, 4,693,814, 4,804,465, 4,889,623, 4,943,371, 4,990,245, 5,022,994, 5,060,167, 5,069,779, 5,073,255, 5,089,140, 5,116,491, 5,157,979, 5,512,168, 5,589,058, and also from the patent documents:

EP 219,704, DE 1,517,483, DE 2,001,516, DE 2,060,751, DE 2,131,117, DE 2,319,343, DE 2,339,589, DE 2,652,113, DE 4,227,135, FR 2,223,609, NL 7114100 and WO 9413379.

The invention aims at providing a water treatment device which is considerably simplified.

Furthermore, the invention aims, according to a preferred form of embodiment, at an embodiment which, with regard to the known embodiments, shows various additional advantages, such as a very accurate regulation, the aptness for the treatment of small usage volumes, the simple possibility of expansion to larger usage volumes, and the more efficient use of the available treatment medium and regeneration means.

To this aim, the invention in the first place refers to a water treatment device, of the type whereby the water during treating is brought into contact with a treatment medium, whereby this treatment medium, either by means of a regeneration medium or not, is regenerated regularly and whereby, to this aim, a regulator is used which is provided, on one hand, with a hydraulically driven first monitoring mechanism with which the water consumption can be controlled and the start of the regeneration cycle can be ordered, and, on the other hand, with a hydraulically driven second monitoring mechanism with which the regeneration cycle is controlled, characterized in that both monitoring mechanisms are driven by means of the same volumeter.

By using only a single volumeter, the regulator becomes considerably less complicated and also takes less space than in the known hydraulic embodiments.

According to the preferred form of embodiment, a volumetric measuring element is used for the volumeter, this in opposition to the classically applied turbines. The use of a volumetric measuring element for the hydraulic drive of such a measuring regulator shows the advantage that a very accurate measurement is possible, as a result of which the water can be measured very exact for performing the regeneration, and also during the service function the water consumption can be registered precisely, this in opposition to a turbine-meter which is understood to register volumes lower than actual at low flow rates, and even more does not function at very low flow rates. Such turbine-meter also produces a lower driving torque and shows a larger and more complex transmission ratio. By the use of a volumetric measuring element, the conditioning device can thus be made smaller, as a result of which is it not only apt for industrial use, but also for household applications where small, varying flow rates often occur.

The use of a volumetric measuring element also has the advantage that equal exactness is obtained in either flow direction. As a result of this, the conduit circuit of the regulator can be simplified considerably because no complicated switchings have to be performed which have to provide for the water flowing only in one direction through the volumeter.

Such volumetric volumeters are known themselves, amongst others from the literary work "Chemical Engineers' Handbook" by J. H. Perry, fourth edition, 1963, edited by McGraw-Hill Book company, p. 22–25, more particularly the "oscillating-piston meters" and "nutating-piston meters" mentioned on this page.

Further, the water treatment device is provided with a number of valves with which the flow path of the water and the regeneration medium can be altered between a service condition and a regeneration condition. According to a preferred form of embodiment of the invention, the aforementioned regulator provides for a groupwise operation of these valves. This groupwise operation of these valves occurs by groupwise actuation by means of respective servo valves. In this manner, the number of servo valves can be limited considerably, and, according to a form of embodiment of the present invention, even be reduced to two.

According to a particular form of embodiment, this is achieved by using a conduit circuit which, according to the invention, consists of a supply; a treatment tank wherein the treatment medium is contained; a conduit, extending from the supply to the inlet of the treatment tank, in which conduit a first valve is provided; a conduit, connecting the inlet of the treatment tank to a drain, wherein a second valve is provided; a conduit between the outlet of the treatment tank and a usage outlet, in which conduit a third valve is provided; optionally, if regeneration medium has to be supplied, a circuit for the supply of regeneration medium, provided over the third valve in a parallel manner, in which a fourth valve is provided; and a connection between the aforementioned usage outlet and supply, which optionally is provided with a fifth valve; whereby the first valve, the second valve and the fifth valve are controlled by a first of aforementioned two servo valves, the third valve is controlled by the second servo valve, and the fourth valve is controlled by the first servo valve or second servo valve.

For the groupwise operation, according to the invention use is made in an advantageous manner of pressure lines connecting the various valves to each other in such a manner that the servo valves only have to actuate a limited number of valves and one or more other valves react upon this automatically. To this end, in the above described conduit circuit, the fourth valve shall preferably be controlled indirectly by the second or first servo valve by actuating this fourth valve by the pressure drop over the third valve or over the first valve.

The actuation of each of said five valves by means of separate servo valves, however, is not excluded. Also in this case, the invention offers the advantage that only five servo valves are required.

The aforementioned servo valves consist of openings which are closed, respectively opened, by means of a rotating disc, in function of the position of this disc, and which are connected to a chamber wherein water under supply pressure is contained. A particularly advantageous characteristic which results from the aforementioned fact that the number of servo valves is limited to maximum five, and preferably two, consists in the fact that these servo valves can be manufactured with classic sealing materials, as a result of which they are little sensitive to malfunctions, have a low price, and it is not necessary to maintain a very great exactness during mounting, this in opposition to ceramic sealing elements, such as described in U.S. Pat. No. 3,891,552. Hereby is noticed that the use of classic sealing materials such as rubber, in the case of a large number of servo valves is rather impossible because this should afford a large driving torque. The driving torque necessary to operate the large number of valves can materially reduce the starting sensitivity of the meter.

Preferably, the regulator is provided with two discs, driven by means of the volumeter, which provide for the corresponding programming, on one hand, for the regular start of the regeneration cycle, and, on the other hand, for the performance of the regeneration cycle; with means which can interrupt the drive of the second disc up to an inoperative position; and means being active between the first disc and the second disc in order to fetch the second disc, with a well-defined mutual position between both discs, out of the inoperative position; and with reset means in order to bring the first disc with each regeneration back into a starting position. The application of reset means, whether or not in combination with said discs, offers the advantage that a relatively simple regulation is enabled and also offers the advantage that, as shall further become clear from the detailed description, the regulator can simply be provided with adjustable, preferably even externally operationable setting means with which the start of the regeneration cycle can be adjusted in function of the volume of water treated since the preceding regeneration cycle, this according to the degree wherein the water has to be treated. In the case of a water softener, this means that a regulation is possible in function of the hardness of the water.

It is noted that, with the hydraulically driven regulators for water softeners, adjustment of the amount of water treated between the regeneration cycles up to now has only been possible by means of a complex intervention whereby the device has to be dismantled and a new monitoring disc has to be mounted herein, and the device has to be re-assembled. Such an intervention is noted in U.S. Pat. No. 4,298,025 at column 8, lines 25–30.

The drive of the regulator used with the invention, more particularly of the aforementioned discs, can be obtained in different ways. According to a form of embodiment of the invention, the drive is performed by means of ratchet drive mechanisms which offer the advantage that they, whatever the sense of rotation with which the driving pawl is driven, always provide for a same driving movement of the corresponding disc.

According to an important variant, for the drive, instead of the ratchet drive mechanisms, use shall be made of gearwheel drives. The use of gearwheels, in respect to the aforementioned ratchet drive mechanisms, offers the advantage that, instead of an intermittent drive, a continuous drive is obtained, as a result of which the whole can be driven with even smaller drive forces and whereby a larger starting sensitivity is obtained.

More particularly, use shall be made of gearwheels which are driven by means of the volumeter and are movable and which thereby, in function of their position, either directly or indirect, can cooperate with the aforementioned discs.

More particularly, use shall also be made of pivotable arms pivoting freely which are each, on one hand, pivotable round a shaft upon which a gearwheel, driven by the volumeter, is placed, and, on the other hand, are provided with at least one gearwheel which permanently engages in the first-mentioned driven gearwheel and which, by means of the pivoting movement of the pivotable arm concerned, can be moved between at least two positions, respectively a position whereby this gearwheel is coupled to a toothing provided at the circumference of the disc concerned or of an element coupled to the disc, and a position whereby this gearwheel is uncoupled from the disc concerned or the element coupled therewith.

According to a particular form of embodiment, the treatment device is equipped with a regulator which allows for the mutual coupling of several of such devices in an optimum manner. To this aim, the regulator is provided with a mechanism which can be activated by means of an external hydraulical signal, with which the second monitoring mechanism can be activated at any moment. In a practical embodiment, this mechanism consists of an element which can be shifted to and fro by means of a drive element and which can push the second disc out of the inoperative position.

In the case that the treatment device functions as a water softener, the treatment medium, as usually with water softeners, is formed of a resin, arranged in a treatment tank, and the regeneration medium consists of brine from a brining device or brine container.

Hereby, use can be made of known brining devices or simply of a brine-refillable barrel, but preferably a brining device shall be applied which, according to a preferred form of embodiment of the invention, is equipped with a hydraulically driven volumetric dosing element for dosing the brine during regeneration. The application of a volumetric dosing element, in opposition to the classical dosing system, based upon the Venturi principle, also called ejector-principle, has the great advantage that the dosing is performed very accurately, which is first of all important in regard to the manufacture of a device which works accurately, has optimum dimensions and can supply an exactly measured quantity of brine.

In a preferred form of embodiment, the hydraulically driven volumetric dosing element consists of a pump element, installed in a chamber, in the shape of a membrane which defines at one side a first compartment which, via at least one suction valve, is connected to a brine reservoir and, via at least one pressure valve, is or can be connected to the outlet of the treatment tank, and that at its other side defines a second compartment wherein a hydraulic pressure can be created. In a particular form of embodiment, this dosing element is given a double function by manufacturing the second compartment as a dosing chamber with which the water in the brining device, after removal of a quantity of brine, is refilled. This dosing is considerably more accurate than the up to now mostly used float dosing systems.

In accordance with the invention, the said dosing element can also be used for dosing regeneration mediums other than brine, e.g. in other applications than water softeners.

In the case that a large or relatively large water flow quantity has to be treated, several treatment devices shall be placed in a parallel manner. According to a particular form of embodiment of the invention, this is realized by means of a special mutual coupling and arrangement, such, that the various treatment tanks can be used in an optimum manner and the treatment medium present in them, however, still can be regenerated in time. Furthermore, it is aimed at an arrangement which allows that no treatment tank has to be placed into stand-by after regeneration. The optimum usage of the treatment tanks in its turn contributes to an optimum dimensioning of the whole and to a low price together with a large treatment capacity.

It is noted that the invention also relates to a water treatment device of the type whereby the water during treating is brought into contact with a treatment medium, whereby this treatment medium, by means of a regeneration medium, is regenerated regularly, characterized in that it is provided with a hydraulically driven control mechanism for starting the regeneration cycle, for example, a totalisator in form of a rotary driven disc, whereby this control mechanism is equipped with automatically working reset means, regardless whether, as mentioned before, use is made of only one volumeter or not. As a matter of fact, the use of such reset means offers various advantages, as well for water treatment devices which, as mentioned heretofore, have only one meter for driving the control mechanism of the water consumption as well as the control mechanism for the regeneration cycle, as for water treatment devices which are driven hydraulically in another manner, for example, by means of two separate meters.

The use of reset means, regardless whether it is worked with only one meter or several meters, offers, amongst others, the advantage that the functioning of the device can easily be adapted to the hardness of the water. In a preferred form of embodiment, this water treatment device then shall be provided with a regulator with adjustment means with which the start of the regeneration cycle, in other words, the volume of treated water between two regeneration cycles, can be adjusted, whereby these adjustment means work cooperate with the aforementioned reset means, in such a manner, that the course of the resetting movement can be changed by means of the adjustment means. Hereby, the adjustment means preferably can be operated externally. The resetting is performed automatically each time a regeneration cycle is started or is gone through.

Furthermore, the invention also relates to a water treatment device of the type whereby the water during treating is brought into contact with a treatment medium, whereby this treatment medium consists of a resin bed, for example, a cation exchanger resin, for softening water, whereby this resin bed is regenerated regularly by means of a regeneration medium, for example, sodium chloride, with the characteristic that use is made of hydraulic control means with at least one water meter which, during the regeneration, more particularly during the passage of the regeneration medium through the resin bed and the subsequent slow rinsing, provide for a controlled flow rate through the resin bed which is equal to or smaller than 10 times the bed volume per hour, and that use is made of a resin with a high exchange speed, more particularly an exchange speed which is larger than or equal to 100 bed volumes per hour.

Hereby, as bed volume the volume is understood which is taken by the resin when the resin particles are situated normally upon each other. Hereby, thus, the free spaces between the resin particles are included.

As a result of this, a particularly high efficiency of the regeneration medium is obtained, and a small resin bed can be used and a large passage flow during service can be obtained. Due to this combination, little regeneration medium is lost and, without using electric or electronic regulation systems, a small, budget-priced device can be realized.

In a particular form of embodiment, the water treatment device is provided with a regulator which provides for that, during regeneration, only a portion of the water flows through the resin bed, whereby the flow rate through the resin bed is kept smaller than 5 bed volumes per hour and also the total flow rate through the water meter is kept smaller than 10 bed volumes per hour.

In order to provide for a controlled flow rate, the hydraulic control means preferably comprise one or more flow regulators which limit the flow to the aforementioned flow rates.

The last mentioned characteristic of the invention can be applied in water treatment devices which, as mentioned before, are equipped with only one meter, as well as in devices with two and more meters. In order to control the aforementioned low volume flow rate of less than 10 bed volumes per hour in an efficient manner, for the regeneration preferably use shall be made of a volumetrically working volumeter.

Finally, the invention also refers to a water treatment device which, either in combination with the characteristics described here aforehand or not, shows one or the combination of two or more of the following features:

that it comprises a conduit with valves with which the path which has to be followed by the water and the regeneration medium can be altered, whereby these valves are driven by means of maximum five servo valves;

that in the preceding case the number of servo valves is maximum two;

that it comprises a conduit with two valves which are triggered by two servo valves which are formed by openings which are opened, respectively closed, by means of a rotating disc, more particularly a control disc, whereby these openings are arranged at opposite sides of the rotation axis of the control disc, approximately diametrically opposite to each other;

that the aforementioned servo valves use valve seals which are formed of an elastic material which, by its resilience, guarantees a sealing against the disc;

that the disc mentioned in the preceding section consists of plastic material, whereby the sealing at the servo valves is performed by means of enlargements;

that the water treatment unit consists of several treatment tanks, whereby various, and preferably all, treatment tanks are connected to a single common reservoir with regeneration medium;

that it is provided with a safety system, more particularly a brining safety system which either reacts to the pressure drop via an element that is mounted in the conduit, more particularly the pressure drop over a valve or a regulation element, such as a flow regulator, or which is controlled by means of one of the servo valves;

that it is provided with a regulator with externally operable adjustment means for adjusting the hardness;

that it is provided with a supply device for the supply of regeneration medium, whereby this supply device comprises a double-working volumetric dosing element, on the one hand, for dosing of the regeneration medium, and, on the other hand, for dosing of the water for the production of additional regeneration medium;

that it is provided with a supply device for the supply of regeneration medium with an elastic dosing element which, by means of its own elasticity, sucks up the quantity of regeneration medium to be dosed;

that it is provided with a supply device for the supply of regeneration medium which is formed by a dosing system and a floating mechanism, both in the shape of a module, whereby the treatment apparatus itself and the aforementioned two modules are mounted in the reservoir containing the regeneration medium.

With the intention of better showing the characteristics according to the invention, several preferred forms of embodiment are described hereafter, by way of example and without any limitative character, with reference to the enclosed drawings, wherein:

FIG. 1 schematically shows a known embodiment of a water treatment device;

FIG. 2 schematically shows a device according to the present invention;

Figure 4:
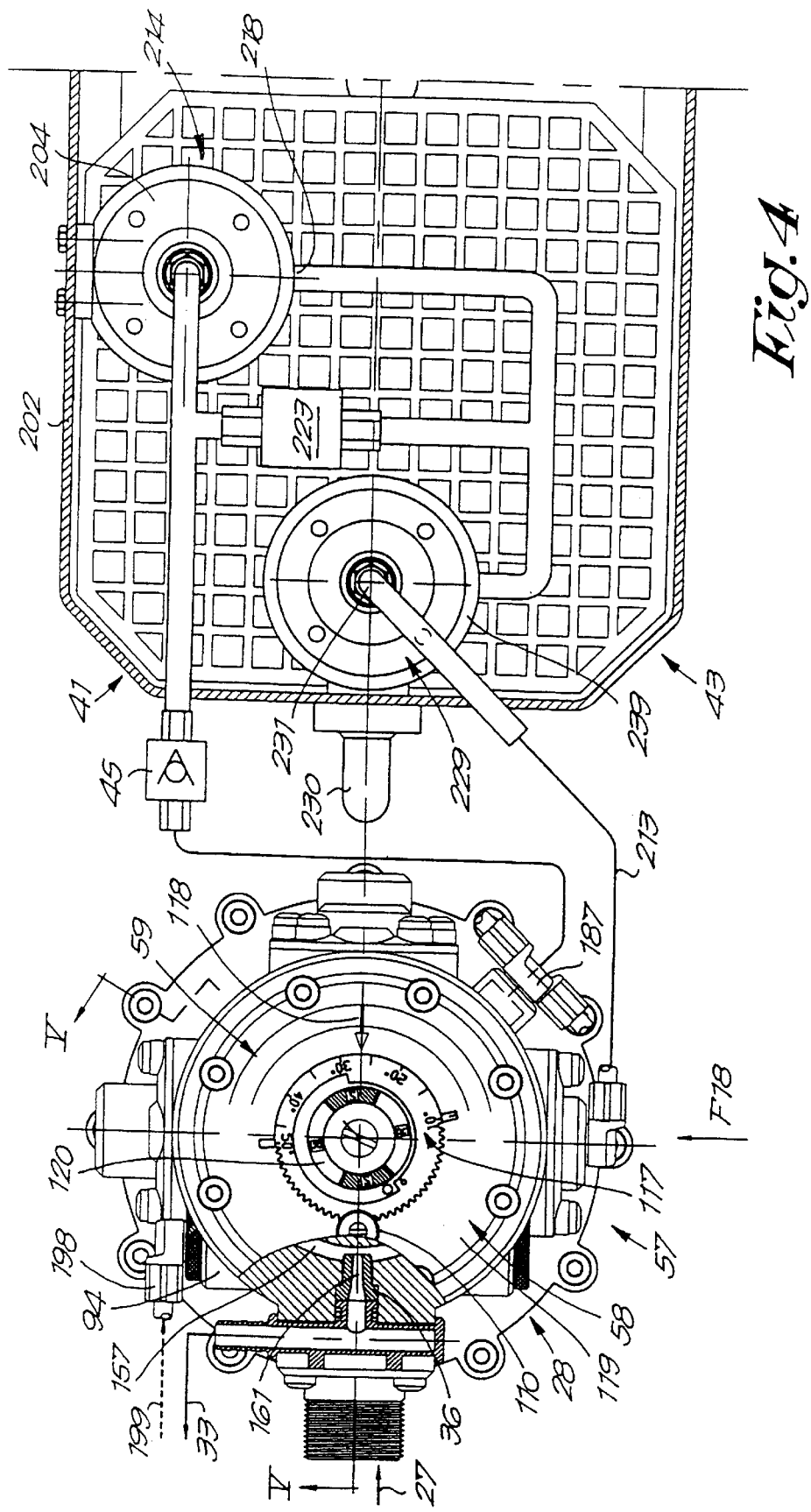
FIG. 4 shows a cross-sectional view according to line IV—IV in FIG. 3.
Figure 5:
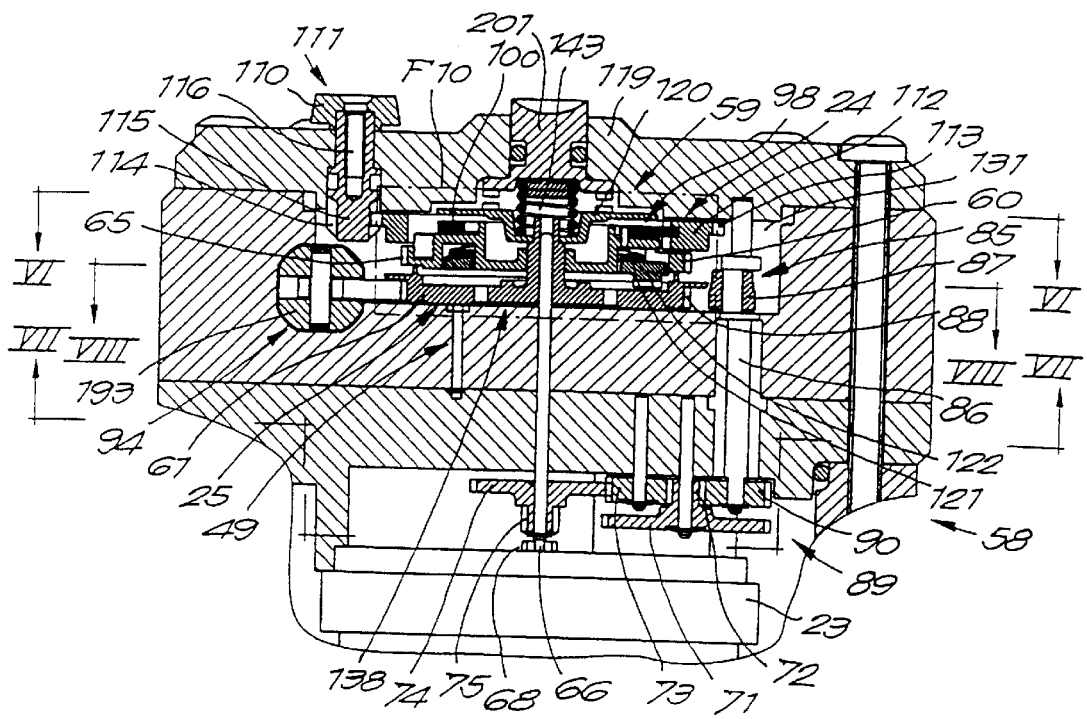
Figure 7:
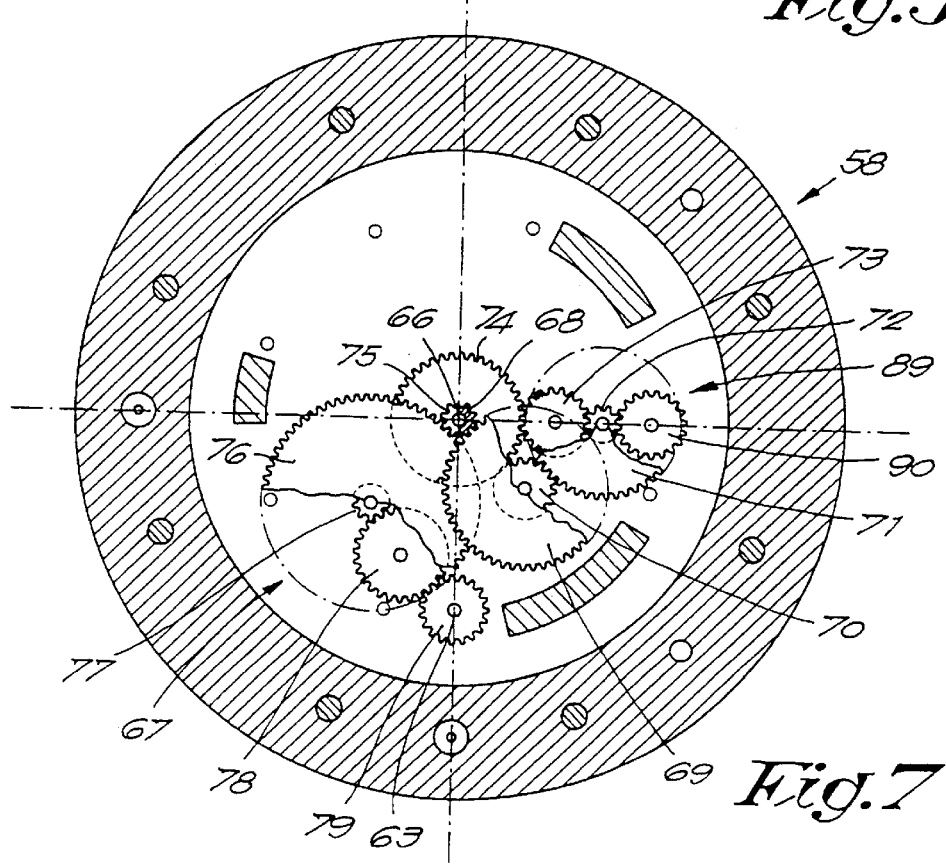
Figure 8:
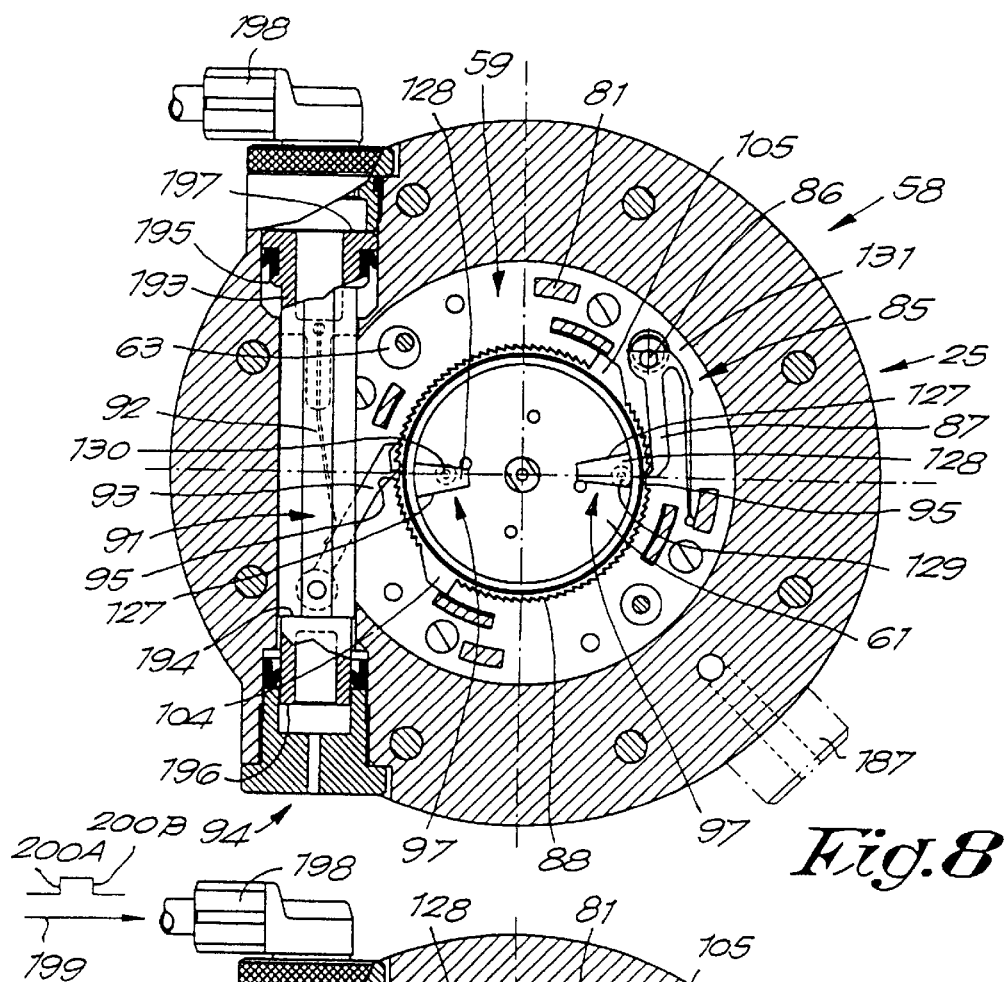
Figure 9:
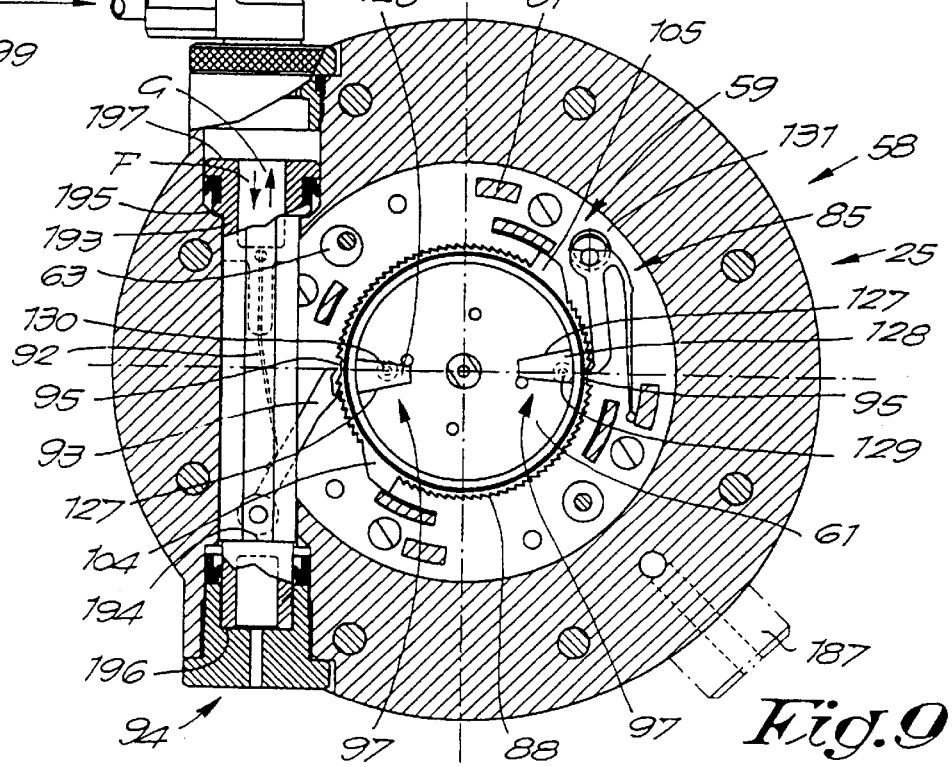
Figure 18:
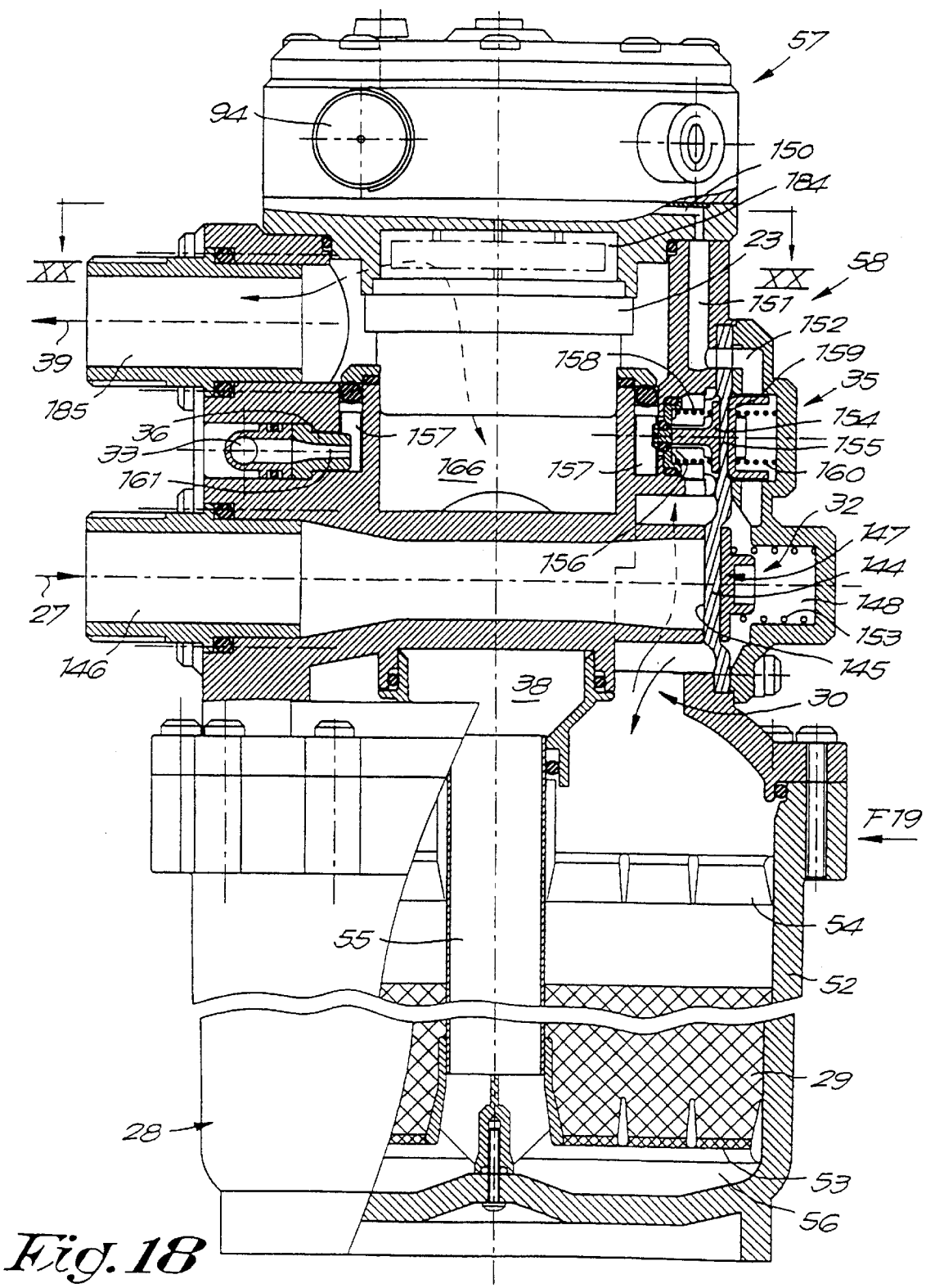
Figure 19:
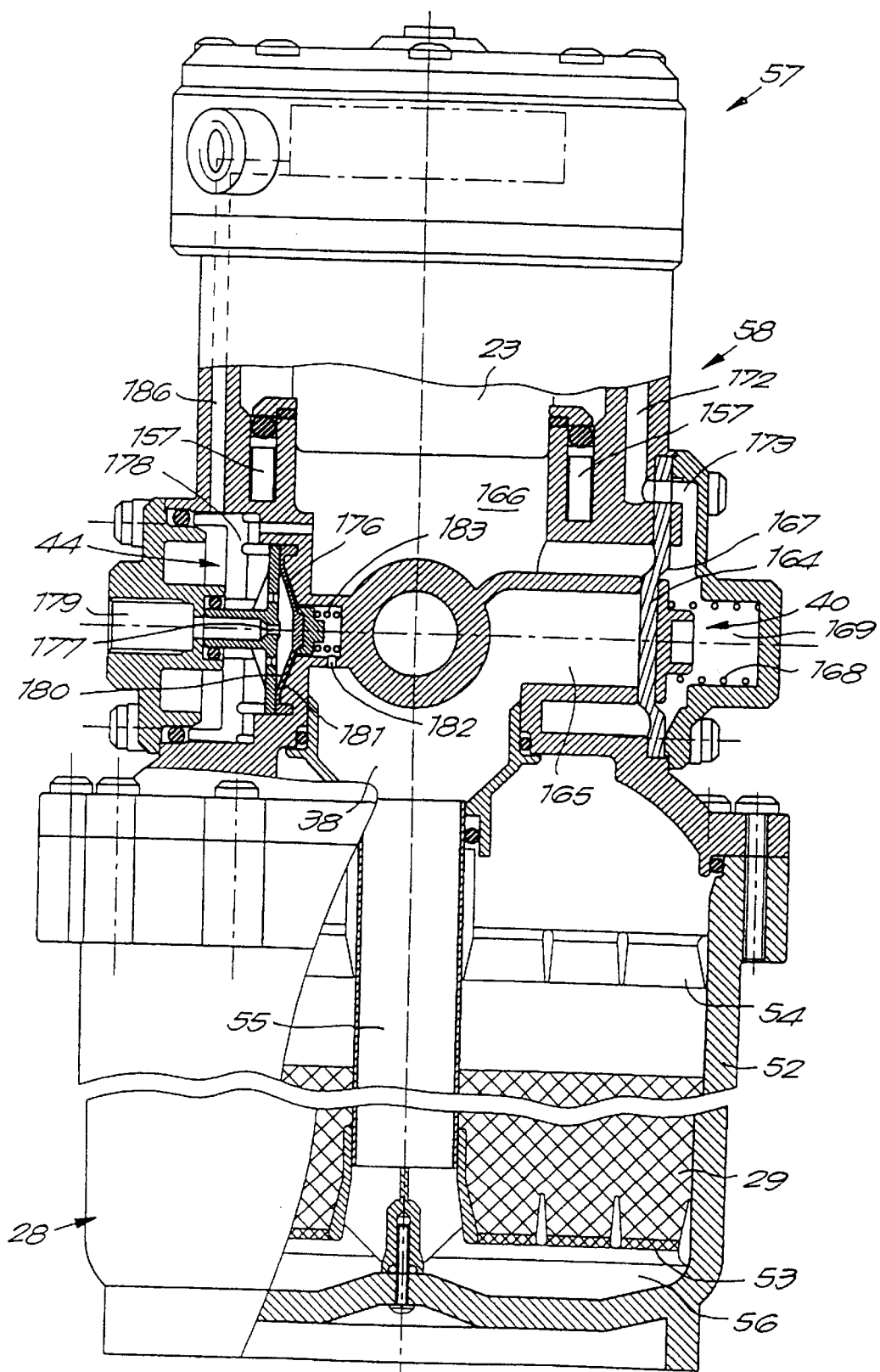
Figure 20:
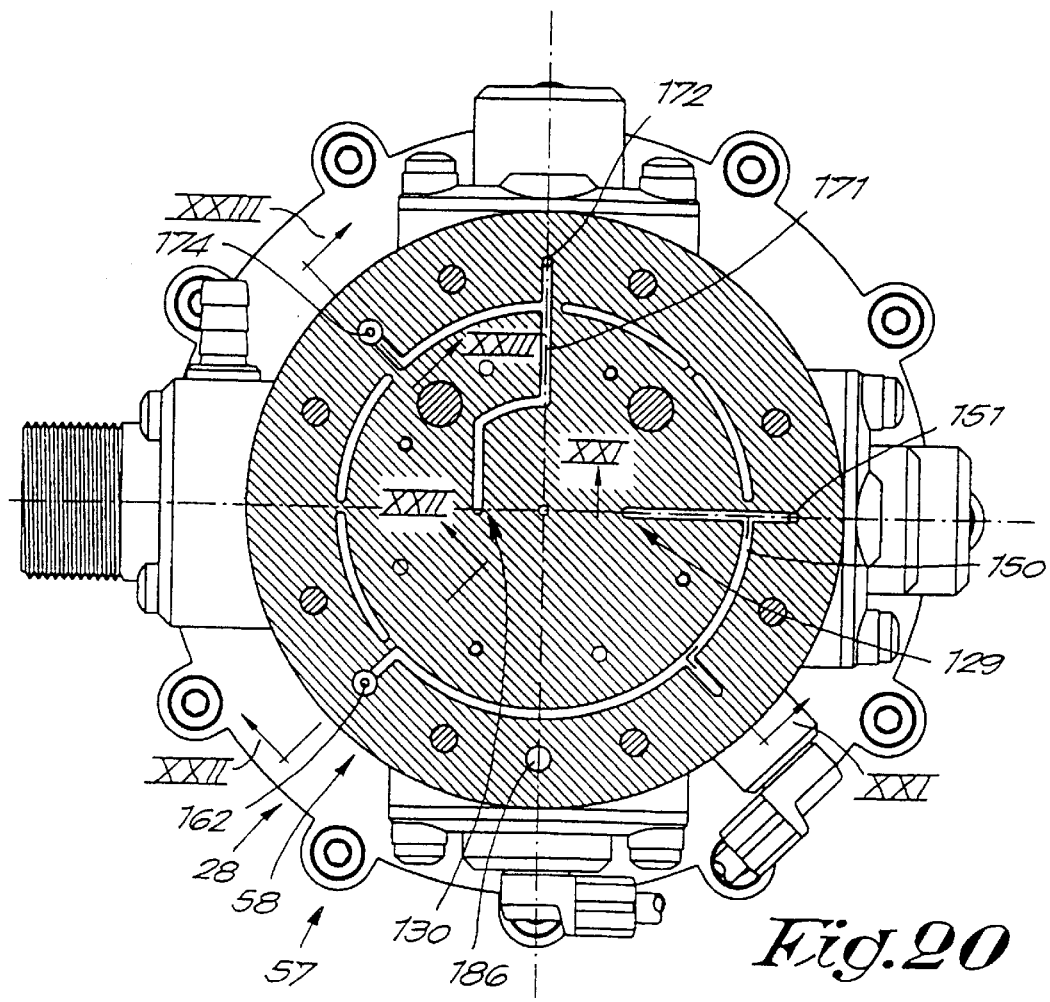

FIG. 5, on a larger scale, shows a cross-sectional view according to line V—V in FIG. 4;

FIGS. 6, 7 and 8 show cross-sectional views according to lines VI—VI, VII—VII and VIII—VIII in FIG. 5;

FIG. 9 shows a view similar to that of FIG. 8, but for another position;

FIG. 10, in an exploded view, shows the parts which are indicated by F10 in FIG. 5;

FIGS. 11 and 12 show cross-sectional views according to lines XI—XI and XII—XII in FIG. 10;

FIG. 13 shows a view according to arrow F13 in FIG. 10;

FIG. 14 shows a cross-sectional view according to line XIV—XIV in FIG. 10;

FIG. 15 shows a view according to line XV—XV in FIG. 10;

FIGS. 16 and 17, on an enlarged scale, show cross-sectional views according to lines XVI—XVI and XVII—XVII, respectively, in FIGS. 12 and 13, whereby FIG. 17 also is showing the servo valves;

FIG. 18, on an enlarged scale, shows a view according to arrow F18 in FIG. 4;

FIG. 19 shows a view according to arrow F19 in FIG. 18;

FIG. 20 shows a cross-sectional view according to line XX—XX in FIG. 18;.

Figure 2:
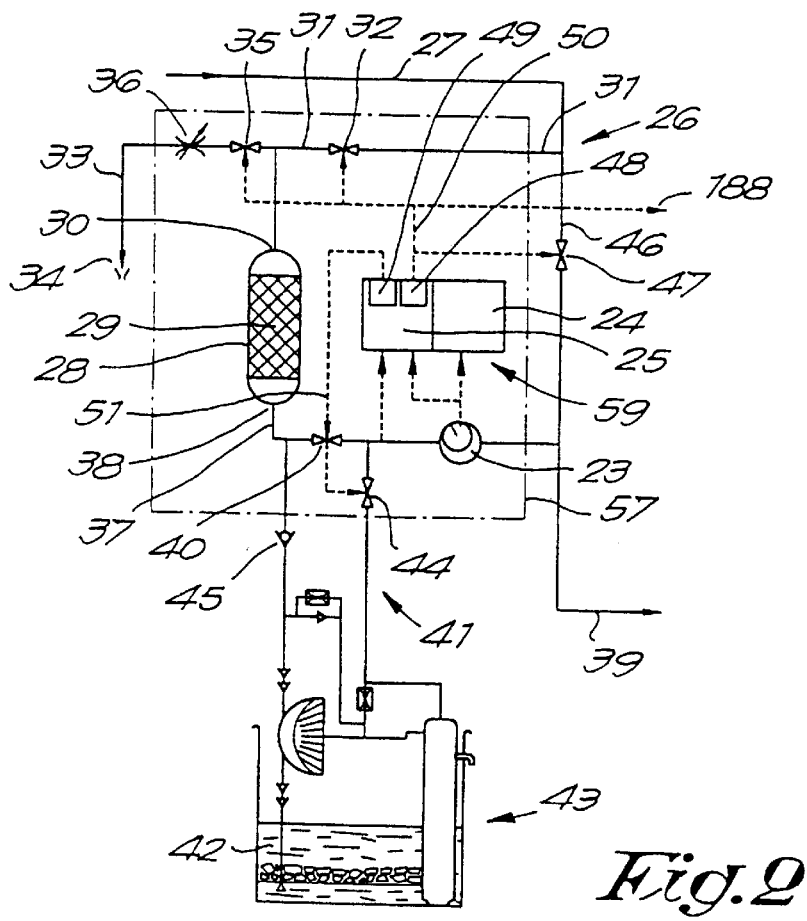
Figures 21, 22, 23:
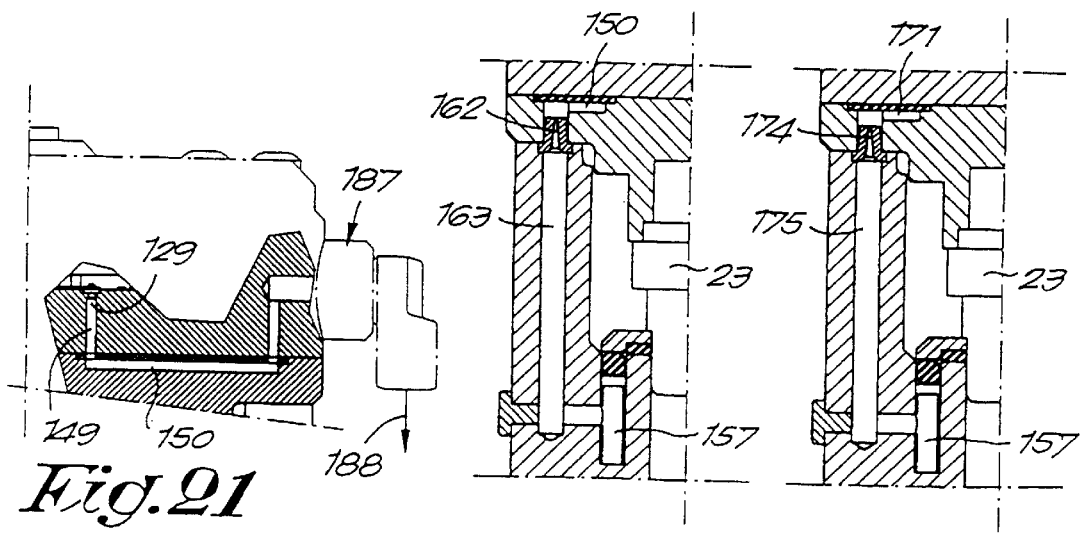
Figure 28:
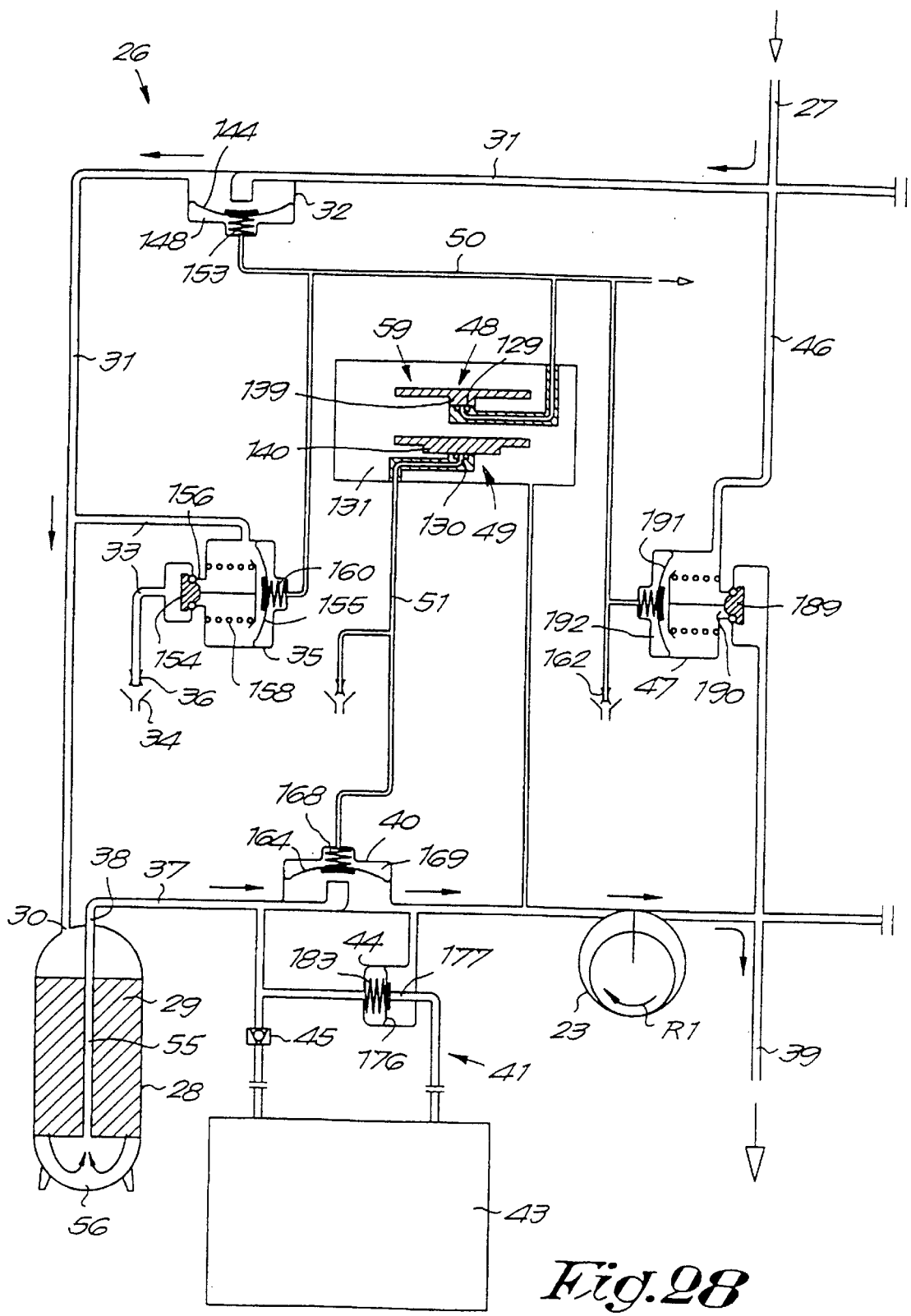
Figure 32:
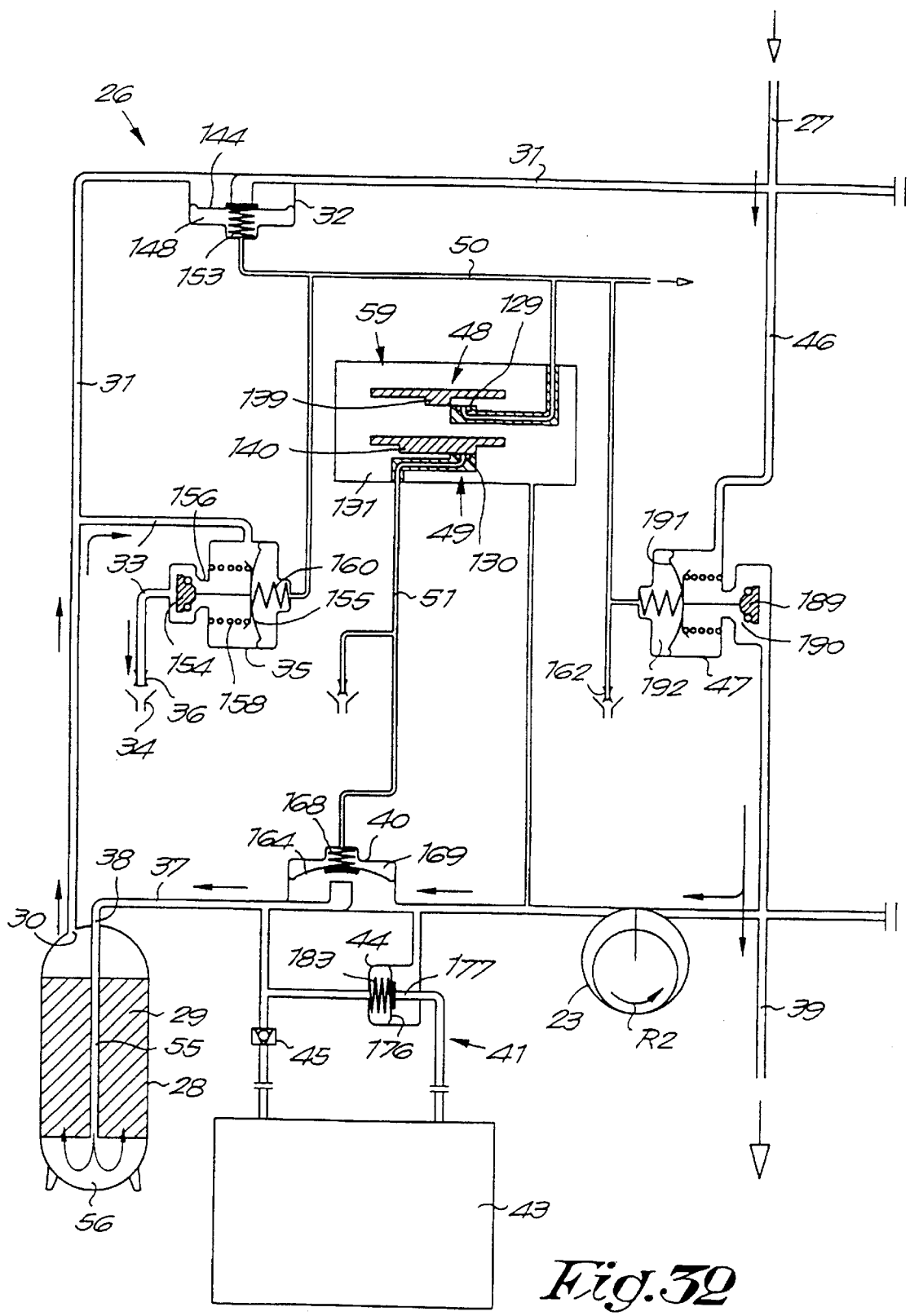
Figure 34:
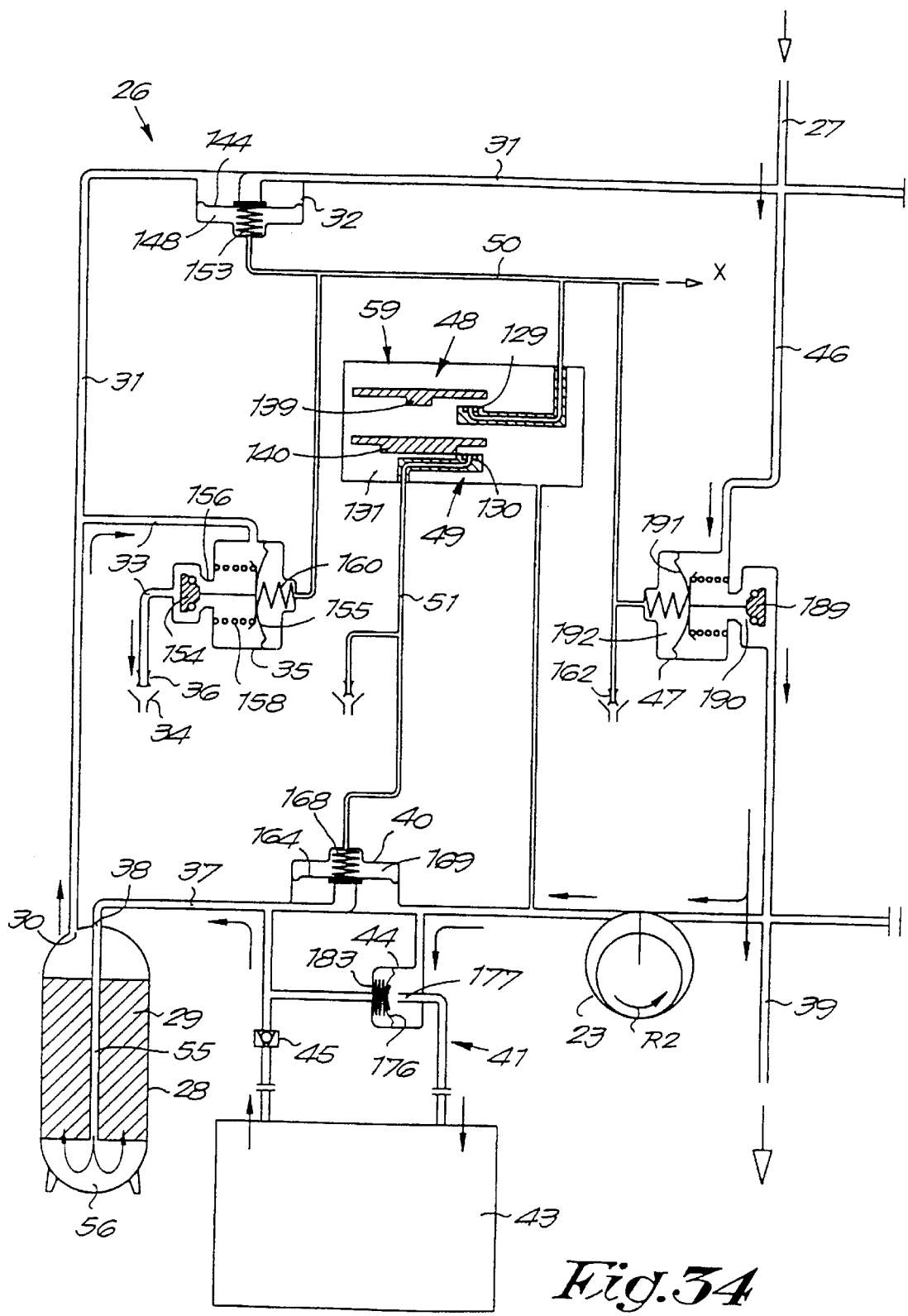
Figure 37:
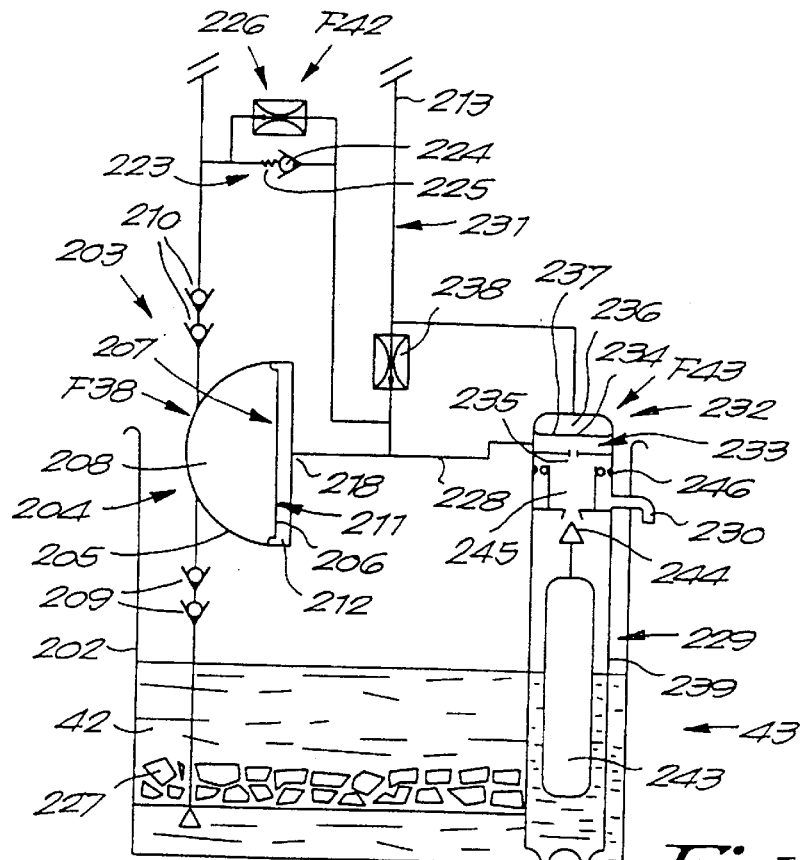
Figure 47:
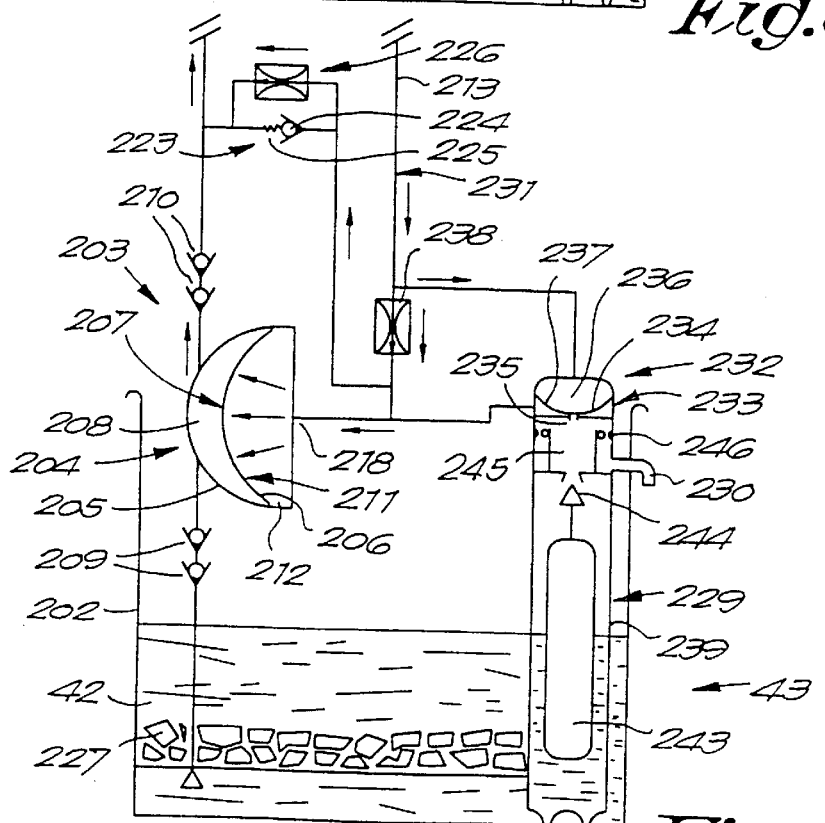
Figure 38:
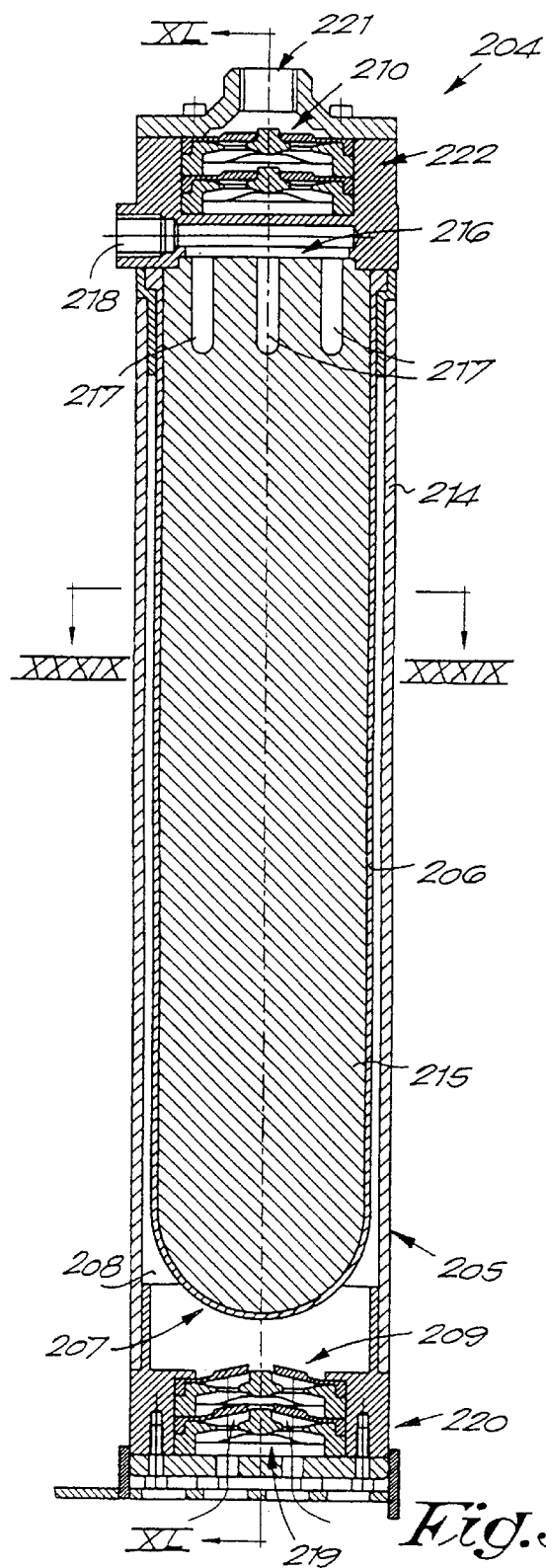
Figure 40:
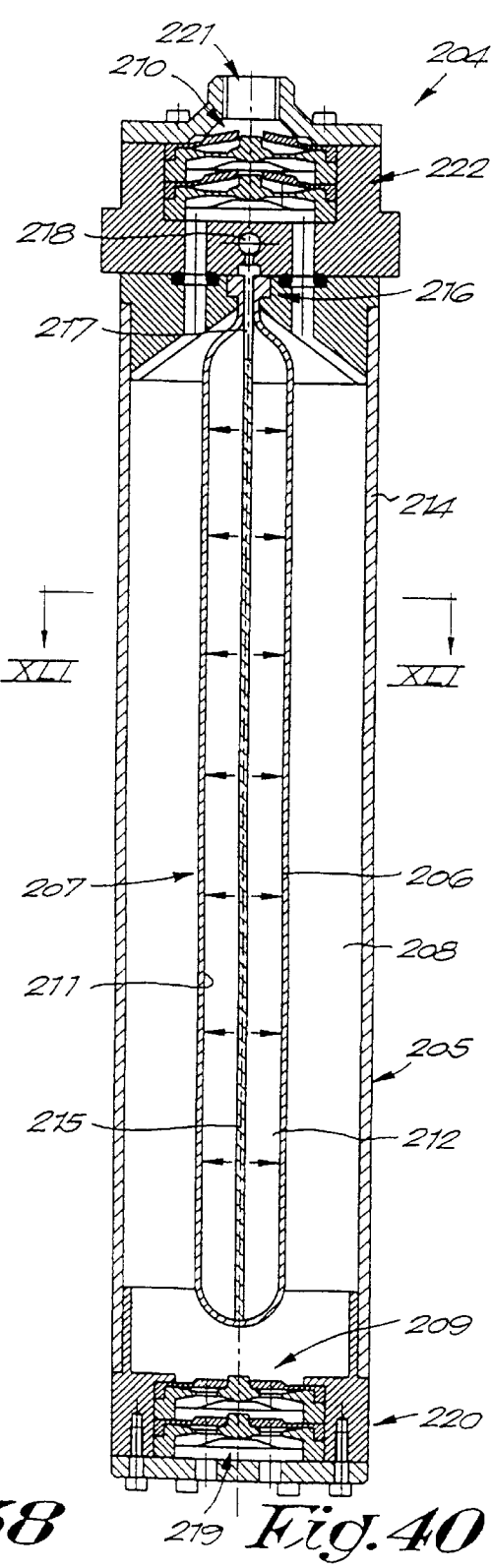
Figure 39:
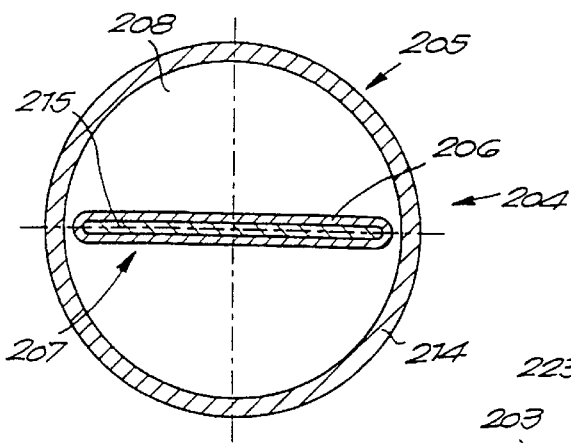
Figure 41:
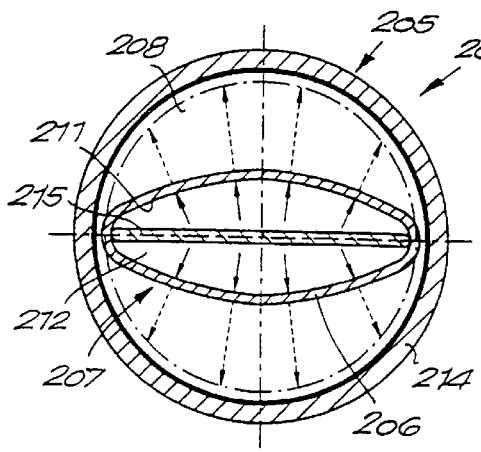
Figure 48:
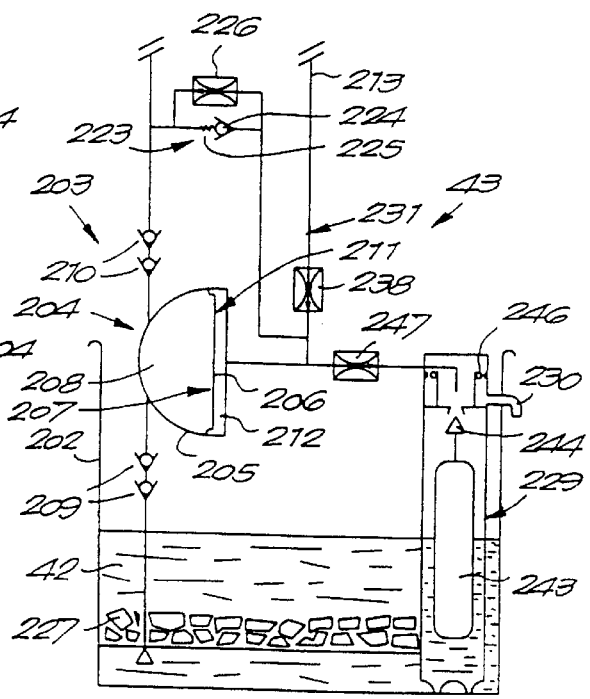
Figure 50:
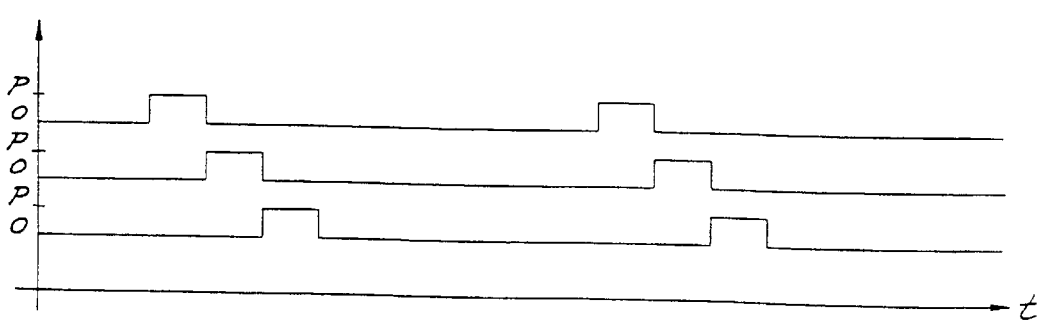
Figure 40:
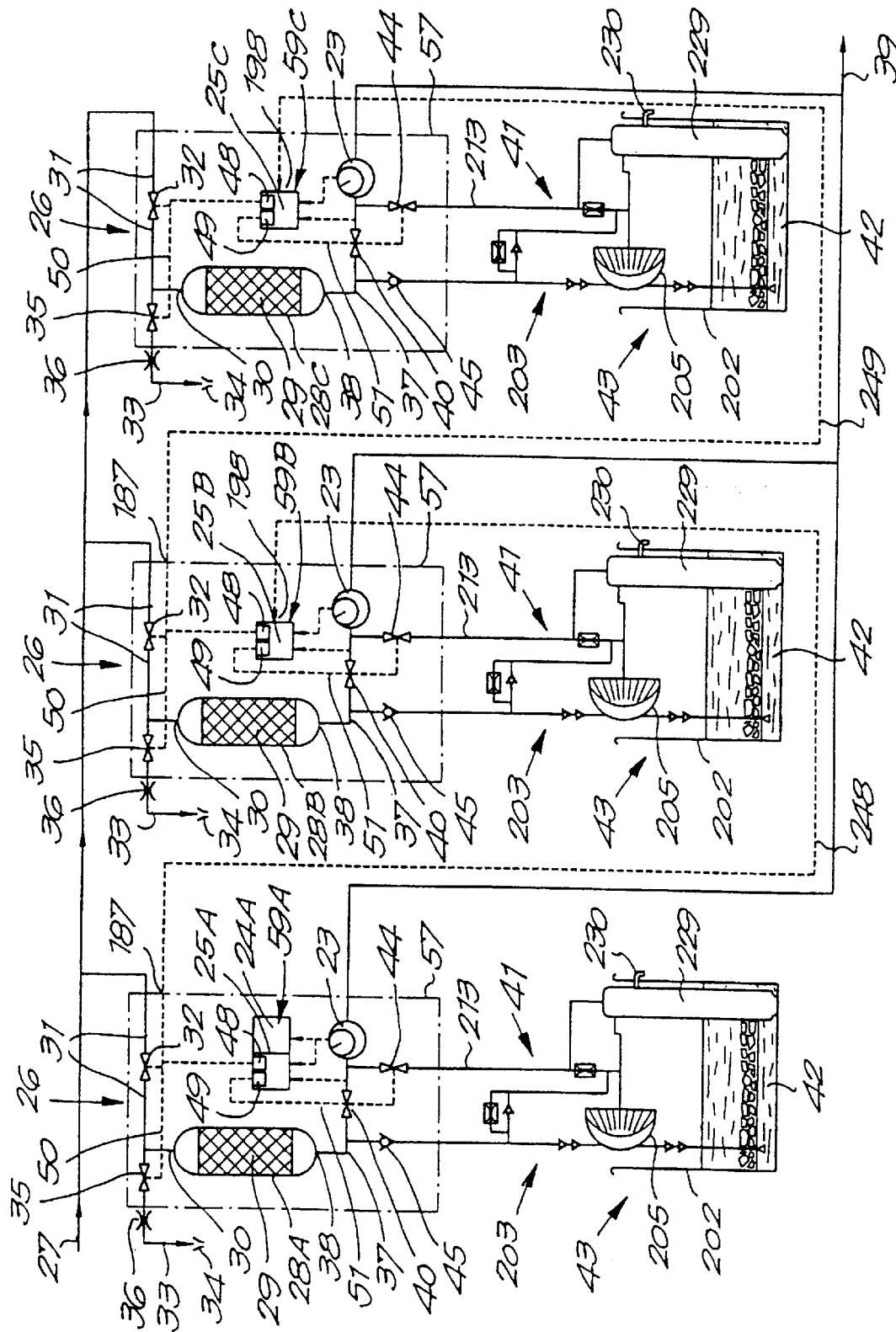
Figure 51:
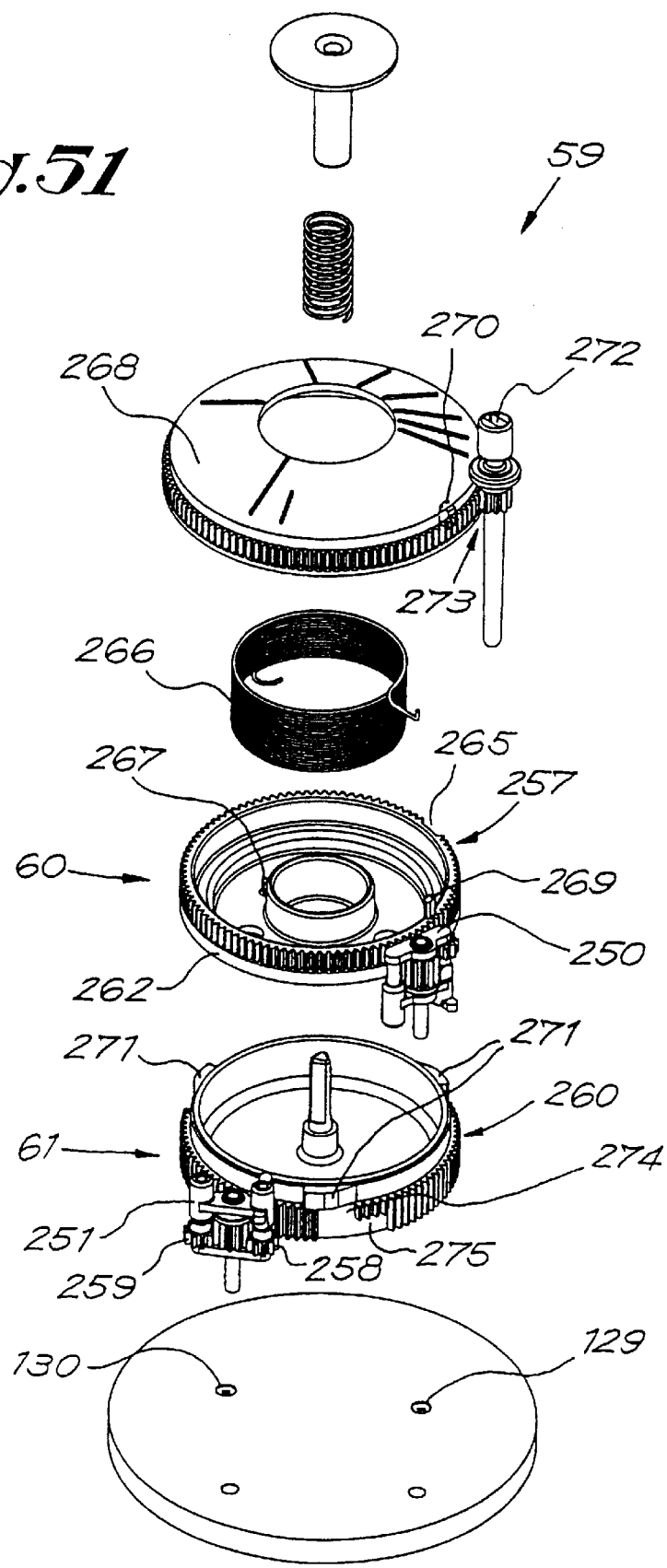
Figure 52:
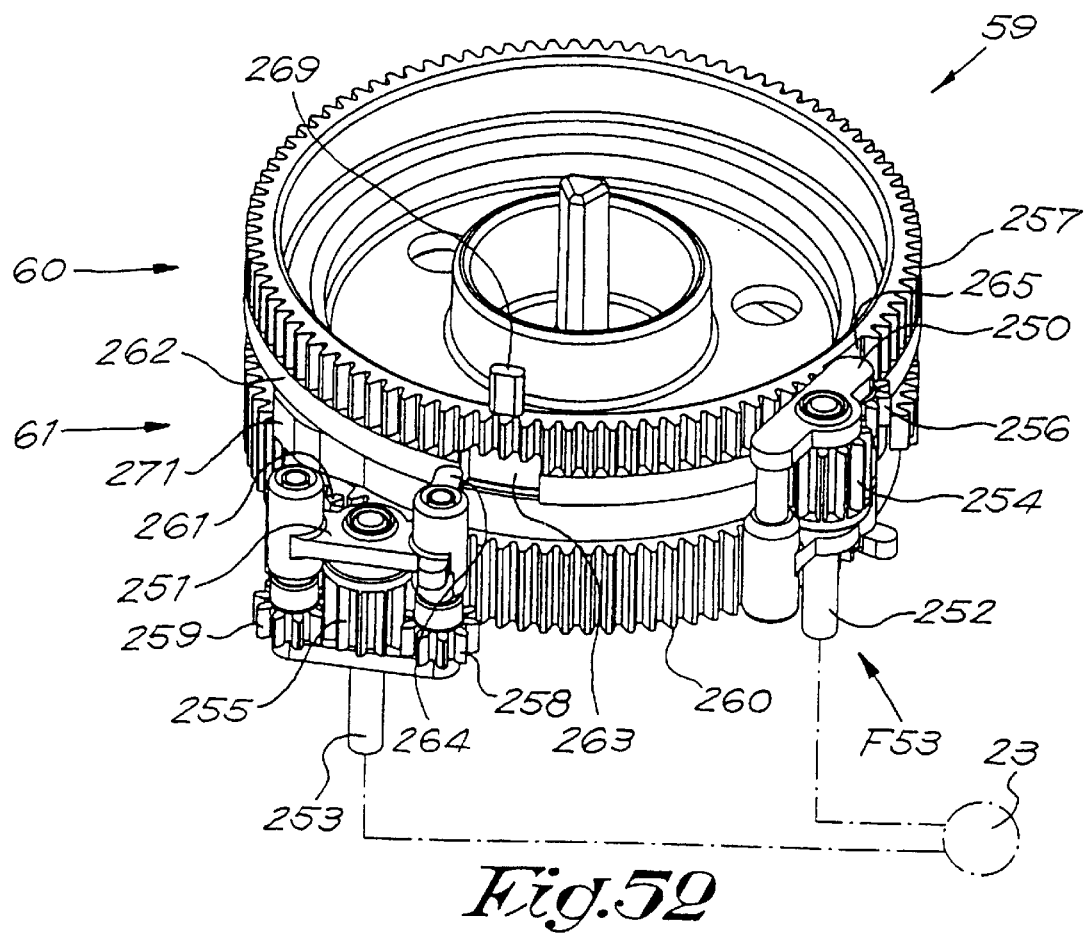
Figure 53:
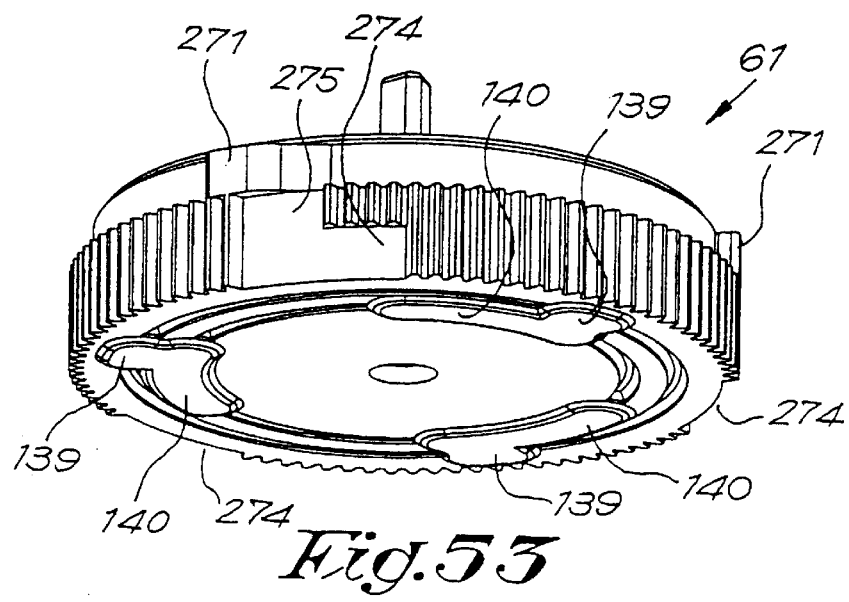
Figure 54:
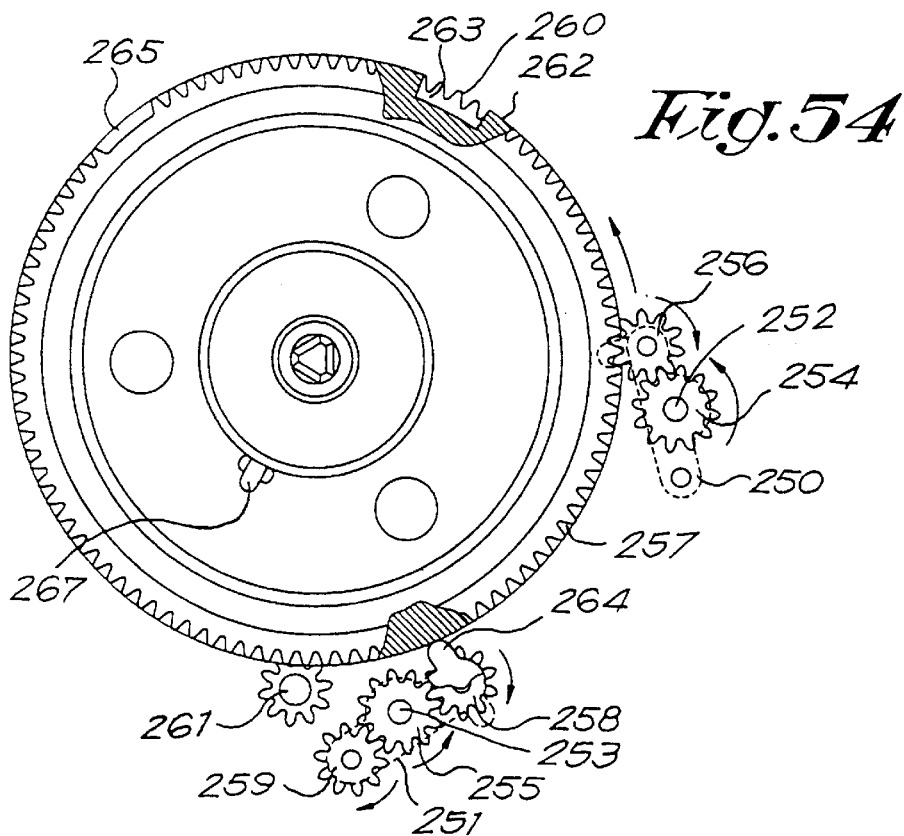
Figure 55:
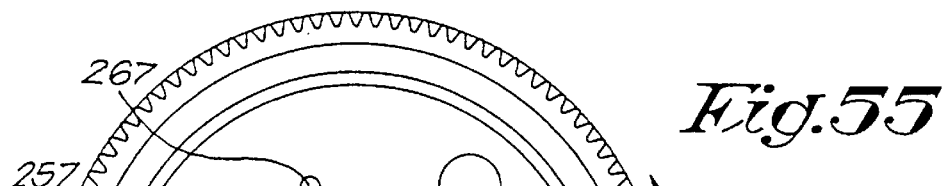
Figure 56:
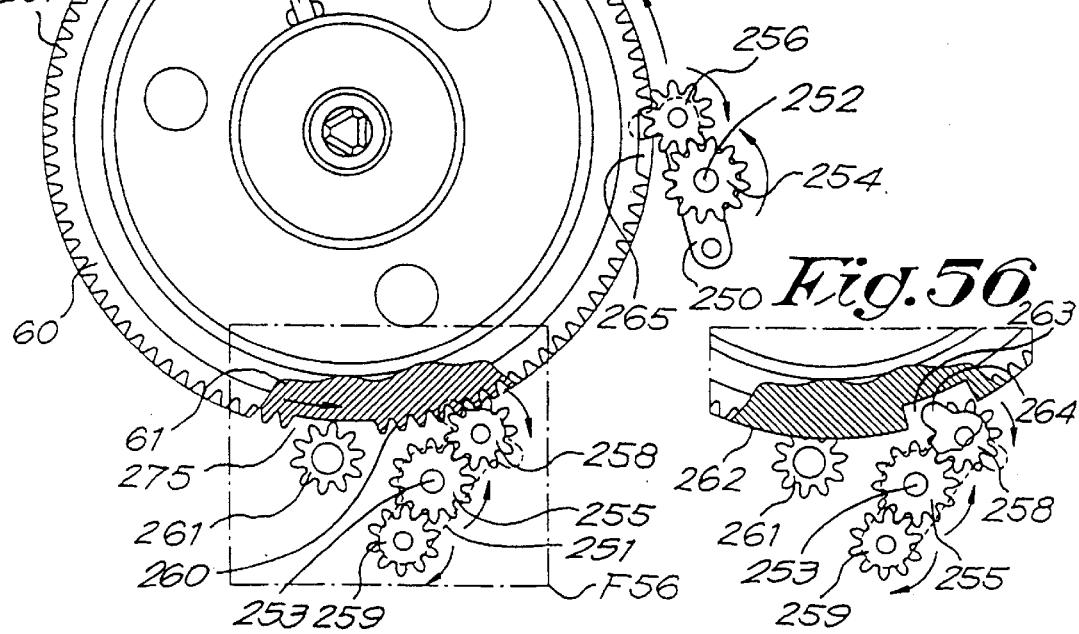

FIGS. 21 and 22 show cross-sectional views according to lines XXI—XXI and XXII—XXII in FIG. 20;

FIG. 23 shows a cross-sectional view according to line XXIII—XXIII in FIG. 20;

FIGS. 24 to 27, in a schematic way, show several parts of the regulator of FIG. 5 for a well-defined working condition;

FIG. 28 shows another schematic view of the circuit represented in FIG. 2;

FIGS. 29 to 31, in a schematic way, show the above-mentioned parts of the regulator for still other working conditions;

FIG. 32 shows the circuit represented in FIG. 28 in another working condition;

FIG. 33 is a view similar to that of FIG. 31, for still another working condition;

FIG. 34 shows the circuit represented in FIG. 28 in still another working condition;

FIGS. 35 and 36, in a schematic way, show two of the above-mentioned parts of the regulator, for still other working conditions;

FIG. 37 schematically shows a brining device which preferably will be used in conjunction with the present invention;

FIG. 38 shows a practical embodiment of the part which in FIG. 37 is indicated by F38;

FIG. 39, on an enlarged scale, shows a cross-sectional view according to line XXXIX—XXXIX in FIG. 38;

FIG. 40 shows, in another working condition, a cross-sectional view according to line XL—XL in FIG. 38;

FIG. 41, on an enlarged scale, shows a cross-sectional view according to line XLI—XLI in FIG. 40;

FIG. 42 shows a practical embodiment of the overpressure valve indicated by arrow F42 in FIG. 37;

FIG. 43 shows a practical embodiment of the part indicated by F43 in FIG. 37;

FIG. 44 shows a cross-sectional view according to line XLIV—XLIV in FIG. 43;

FIG. 45, on an enlarged scale, shows the part indicated by F45 in FIG. 44;

FIG. 46, shows a cross-sectional view according to line XLVI—XLVI in FIG. 45;

FIG. 47 shows a schematic view similar to that of FIG. 37, for a different working condition;

FIG. 48 shows a schematic view of an alternative embodiment;

FIG. 49 schematically shows a water treatment device according to the invention, provided with a plurality of water treatment tanks;

FIG. 50 shows in a diagram the regeneration sequence of the water treatment tanks of the device shown in FIG. 49;

FIG. 51 in perspective and in dismounted condition shows a variant of the regulator which is shown in FIG. 5;

FIG. 52 shows the most important parts of FIG. 51 in mounted condition;

FIG. 53, on a larger scale and in perspective, shows the part which is indicated in FIG. 52 by arrow F53;

FIGS. 54 to 58 show a top view of the part which is shown in FIG. 53, for different positions, wherein FIG. 56 shows the part which is indicated in FIG. 55 by F56, with a local cross section which, however, is situated at another level.

Figure 1:
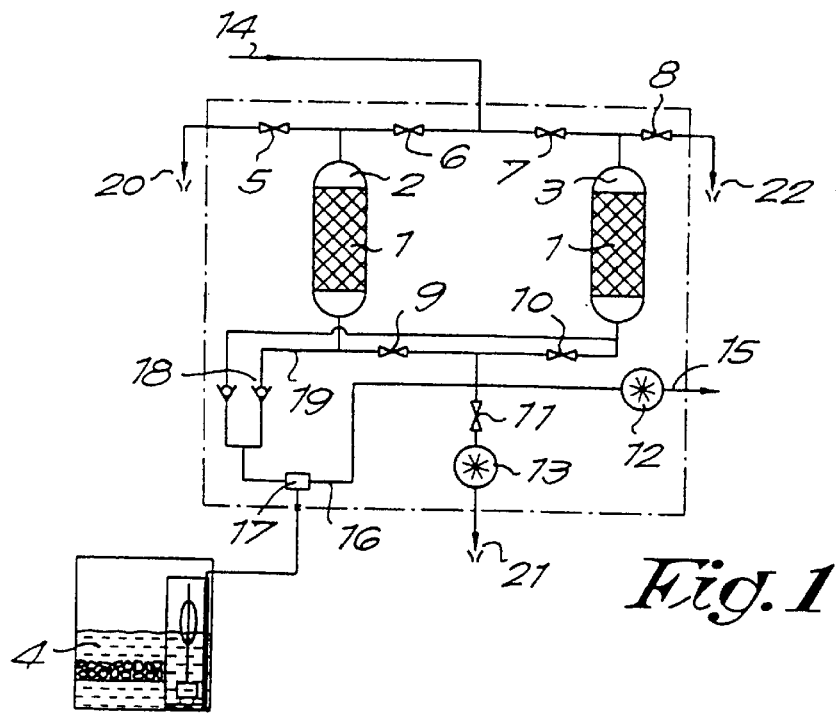

As represented in FIG. 1, for the treatment of water, especially when softening water, the water can be sent via a conduit network through a treatment medium 1 which is contained in one or more treatment tanks 2–3. In the case of softening of water, a treatment medium 1 is used which provides for the exchange of, for example, the calcium and magnesium salts by sodium salts. After a period of time, the treatment medium 1 is saturated and must be regenerated by means of rinsing with a regeneration means 4, for example brine.

As represented in FIG. 1, such regeneration can be performed by using an appropriate conduit network which is provided with various valves 5 to 11. Hereby, these valves are actuated in such a manner that one of the two treatment tanks 2–3 is always in use, while the other one is kept ready in regenerated condition in stand-by.

As also represented in FIG. 1, it is known, among others from U.S. Pat. No. 3,891,552, to actuate the whole by means of two monitoring mechanisms, whereby these latter are driven by separate volumeters 12 and 13. Volumeter 12 measures the quantity of consumed water and provides for starting the regeneration cycle each time a predefined water volume has passed through the device. Volumeter 13 drives the monitoring mechanism which has to provide for that the regeneration cycle is performed in an appropriate manner.

The known device from FIG. 1 hereby functions substantially as follows.

During the treatment of water by means of the first treatment tank 2, when the second treatment tank 3 is not regenerating, the valves 5, 7, 8, 10, and 11 are closed and the valves 6 and 9 are open. Hereby, the water flows from the supply 14 through valve 6, through the treatment tank 2 and, via valve 9, to consumer outlet 15. The quantity of water is hereby measured by means of the volumeter 12.

At the moment that the monitoring mechanism which is coupled to volumeter 12 decides that the regeneration has to be started, the valves 6, and possibly later on 9, are closed and 5, 7, 10, and 11 are opened. Hereby, the water to be treated flows from the supply 14 along the second treatment tank 3 to outlet 15, and before valve 9 is closed, in reverse flow direction through the treatment tank 2 to the drain outlet 20, resulting in a backwash. After valve 9 is closed, the water will flow through conduit 16, a dosing element 17, a one-way valve 18 and a conduit 19 in reverse flow through the treatment medium 1 of the first treatment tank 2. In the dosing element 17 which, in the known embodiments, is formed by a Venturi system, also called an ejector, regeneration medium 4 is suctioned which also flows through the treatment medium 1 of the treatment tank 2 and provides for regeneration and which is subsequently, together with the water, conducted via the opened valve 5 to a drain outlet 20.

At the end of the regeneration, the valve 9 can be opened by which a fast backwash is obtained in order to remove salt residues.

Subsequently, the valves 5 and 11 are closed again, as a result of which the treatment tank 2 comes into stand-by position.

During the aforementioned cycle, the various valves are actuated by a servo system which is actuated by means of the aforementioned meter 13. This meter 13 is driven by a leak flow flowing via the open valve 11 to a drain outlet 21.

After a period of time, this is repeated for the second treatment tank 3, whereby the first treatment tank 2 is in service again, and outlet 22 acts in the same way as 20.

In the aforementioned known device, all valves are actuated separately, as a result of which a large number of servo valves is necessary.

As a consequence, this known device shows the disadvantages noticed in the introduction.

According to the invention, as schematically represented in FIG. 2, only one volumeter 23, preferably a volumetric volumeter, is used which drives a first monitoring mechanism 24 with which the water consumption can be controlled and the start of the regeneration cycle can be ordered, and which also drives a second monitoring mechanism 25 with which the regeneration cycle is controlled.

Preferably, the conduit circuit 26 applied hereby substantially consists of a supply 27 for the water; a treatment tank 28 wherein the treatment medium 29 is contained; a conduit 31, extending from the supply 27 to the inlet 30 of the treatment tank 28, in which conduit 31 a first valve 32 is provided; a conduit 33, connecting the inlet 30 of the treatment tank 28 to a drain outlet 34, wherein a second valve 35 and occasionally a regulation element 36 for the passage flow are provided; a conduit 37 between the outlet 38 of the treatment tank 28 and the water outlet 39, wherein a third valve 40 is provided; a circuit 41 for the supply of regeneration medium 42, such as brine from a brining device 43, provided over the third valve 40 in a parallel manner, in which a fourth valve 44 is provided, together with a valve 45, cooperating with the circuit 41, preferably a one-way valve; and a connection 46 between the aforementioned supply 27 and water outlet 39, which optionally is provided with a fifth valve 47 which can be opened during regeneration. For water conditioning installations having but one tank, the fifth valve 47 can make available a continuous water source.

It is noticed that the valve 45 can also be a hydraulically controlled valve which is actuated at the same time as and similar to valve 44. Further, it is also noticed that regulation element 36 can be installed at other places in the circuit, whether or not combined with a non-return valve.

The aforementioned volumeter 23 is placed in a conduit part through which the main flow of the water during treatment occurs, and through which flows the water which is diverted in order to perform the regeneration. To this aim, the volumeter 23 shall preferably be placed within conduit 37, more particularly in the part which extends between the valves 40 and 44 and the water outlet 39.

The activation of the aforementioned valves 32, 35, 40, 44, and 47 preferably is carried out groupwise, whereby the valves 32, 35, and 47 form a first group and the valves 40 and 44 form a second group. As a consequence, for activation, the second monitoring mechanism 25 only uses two servo valves, 48 and 49 respectively. The groupwise coupling is realized in an advantageous manner by means of pressure lines 50 and 51.

Further details are now described hereafter by means of a practical form of embodiment which is represented in the FIGS. 3 to 36.

Figure 3:
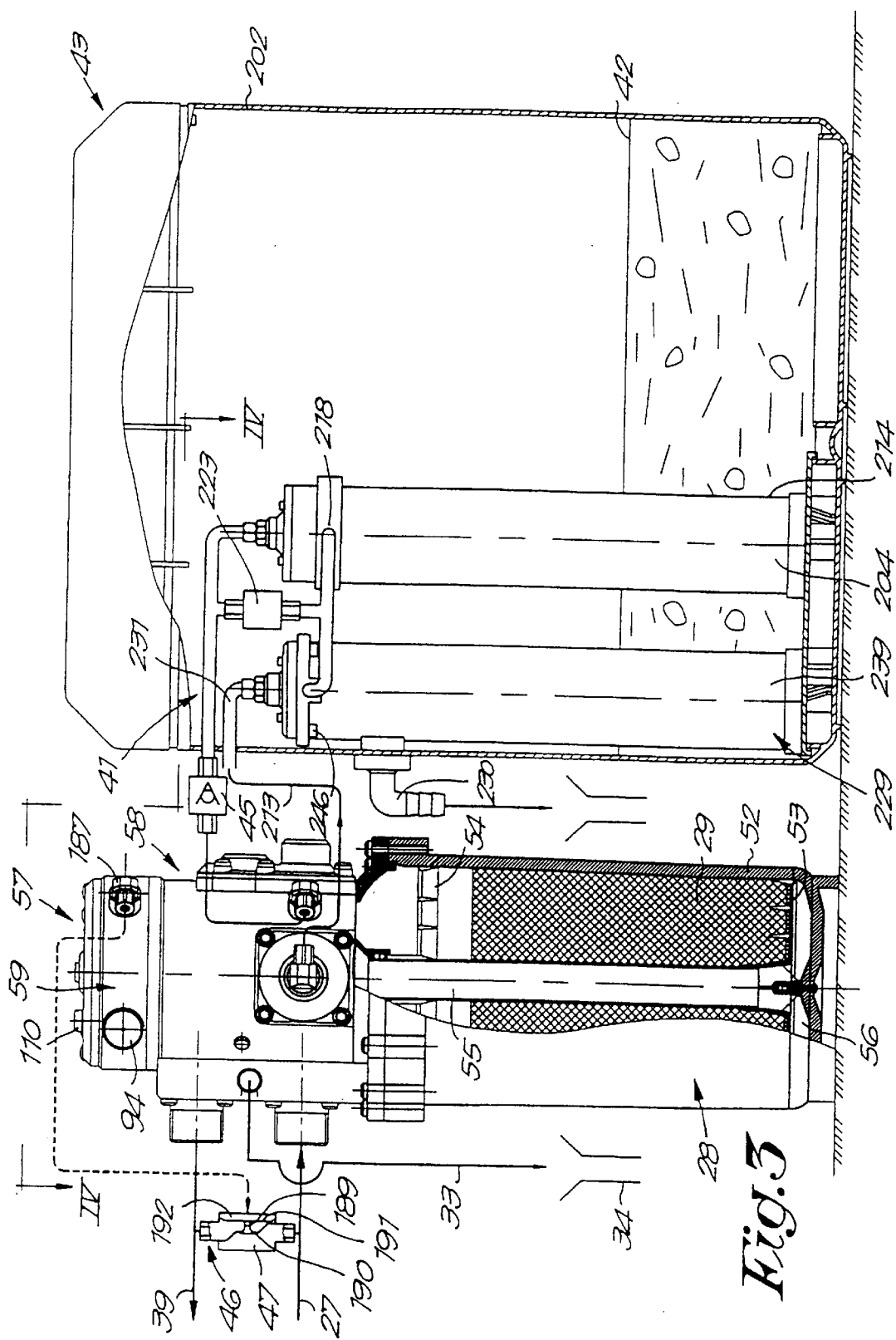
FIG. 3 shows a practical embodiment of a device according to the invention.

As shown in FIG. 3, the treatment tank 28 hereby consists of a vertical reservoir 52 wherein the aforementioned treatment medium 29 is immobilized, for example, by being comprised between two liquid-permeable holders 53–54. The inlet 30 is at the upper side of the reservoir 52. The outlet 38 is formed by the upper end of a pipe 55 which is connected to the lower part 56 of the reservoir 52.

The treatment tank 28 forms a part of an apparatus 57 which, besides this tank, is provided with a head 58 wherein, on one hand, a regulator 59 is mounted which in itself is formed by the monitoring mechanisms 24 and 25, and, on the other hand, various of the aforementioned valves are mounted.

As represented in FIG. 5, each of the two monitoring mechanisms 24 and 25 uses a disc, 60 and 61 respectively, which is driven by means of the volumeter 23.

The drive of the disc 60 is performed by means of a ratchet drive mechanism 62 which, as shown in FIG. 6, is formed of a pawl 64, placed eccentrically upon a shaft 63 and cooperating with a toothing 65, provided at the circumference of disc 60. Hereby, shaft 63 is coupled to the outgoing shaft 66 of the volumeter 23 by means of a gearwheel transmission 67 which is formed by a number of gearwheels 68 to 79, cooperating with each other, as represented in FIG. 7.

The pawl 64 is pressed against the toothing 65 by means of an elastic portion 80 which is in contact with a guidance 81.

Opposite to the ratchet drive mechanism 62, a reverse lock 82 is provided, consisting in this case of a pawl 84 which is pressed against the toothing 65 by means of an elastic element 83.

As represented in FIGS. 8 and 9, the drive of the disc 61 is performed by means of a ratchet drive mechanism 85 which is formed of a pawl 87, placed eccentrically upon a shaft 86 and cooperating with a toothing 88 provided at the circumference of disc 61. Hereby, shaft 86 is coupled to the outgoing shaft 66 of the volumeter 23 by means of a gearwheel transmission 89 which is formed by the already mentioned gearwheels 68 to 72 and a gearwheel 90, placed upon the shaft 86.

Opposite to the ratchet drive mechanism 85, a reverse lock 91 is provided, consisting in this case of a pawl 93 which is pressed against the toothing 88 by means of an elastic element 92, in this case a leaf spring.

In the represented form of embodiment, the reverse lock 91 is part of a further described mechanism 94 which can be activated by an external hydraulic signal which, in its turn, can activate the second monitoring mechanism 25. Hereby, the pawl 93 is rotationally fixed to the mechanism 94.

The second disc 61, which acts as a programming disc, may be provided with one, two, or more similar programs. In the given example, the disc 61 is provided with two programs.

The second disc 61 is provided with means which allow that this disc 61 can assume at least one inoperative position, which, according to the represented form of embodiment, are formed by a toothless part 95, more particularly at two opposite sides of the disc 61 when two programs are used on one disc, upon which the ratchet drive mechanism 85 acts without a drive effect.

In order to be able to start the regeneration cycle and the drive of the second disc 62, means are provided which are active between the first disc 60 and the second disc 61, allowing that the second disc 61 can be fetched from its inoperative position by rotating the first disc 60. In the practical, represented form of embodiment, these means consist of catch elements 96 and 97 which cooperate with the first disc 60 and the second disc 61 respectively and which, by rotation, can come into mutual contact in a well-defined mutual rotational position.

Further, as shown in FIGS. 5, 6, 10, and 14, the first monitoring mechanism 24 is provided with reset means 98 which place this monitoring mechanism 24, each time a regeneration cycle is started, back into a starting position, more particularly, reset means which turn back the first disc 60 into a starting position. These reset means 98 consist in the combination of an elastic element 100 which is wound up during the rotation of the first disc, for example, a flat coil which is, at its ends, fixed between a point 101 at the first disc 60 and a fixed point 102; blocking means preventing or excluding the reverse rotation of the first disc 60 during the winding-up of the elastic element 100, which, in this case, are formed by the already mentioned reverse lock 82; and means 103, cooperating with the second disc 61, which de-activate the blocking means each time a regeneration cycle has started, either immediately after the start or at a later moment.

As represented in FIGS. 6, 10, 12, and 13, the means 103 consist, for example, of contact lips 104 and 105 which are provided at the second disc 61 and which can push the pawls 64 and 84 away from the first disc 60, for example, by coming into contact, when rotated, with pins 106 and 107 which are mounted at the lower side of the pawls 64 and 84. The number of contact lips depends on the number of programs provided on the disc 61.

The stroke of travel of the reset movement of the first disc 60 is defined by abutment means which are formed by an abutment-forming element 108 at the first disc 60 which can come into contact with a stop 109.

An important characteristic consists in the fact that the regulator 59 hereby is provided with externally operationable setting means with which the start of the regeneration cycle can be adjusted in function of the passed water volume. In an advantageous manner, use is made hereby of a mechanism 111 which is adjustable by means of an adjustment button 110 with which the stroke of the reset movement of the first disc 60 can be altered, adjusted larger or smaller respectively. To this aim, the stop 109 is part of an element which can be adjusted by rotation, more particularly, of a ring 112 which is coupled to the adjustment button 110, by means of a toothing 113 at the circumference of the ring, a toothing 114 at a gear wheel 115, and a shaft 116.

The adjustment of the setting means can be read externally, for example, because at the ring 112 indications in form of a scale 117 are provided on which the hardness, more particularly the waterhardness, in degrees or the volume of water in liters to be treated before a regeneration is started are represented. The adjusted value is readable in front of a reference point 118.

It is apparent in FIG. 4 that the scale 117 can be read because the head 58 is provided with a part 119 of transparent plastic material. According to a variant, this part can be provided with a window.

At the same time, an indication may be provided which represents the status of apparatus 57. According to FIGS. 4 and 5, to this aim a small disc 120 is mounted under part 119 which rotates along with the second disc 61 and whereupon indications "S" and "R" are provided which, in reference to reference point 118, indicate whether apparatus 57 is in "service" or in "regeneration".

In order to obtain that only in the forward rotational sense of the first disc 60 a catch effect between the catch elements 96 and 97 is created and the disc 60 during resetting can rotate unhindered, a free-wheel system is provided between the discs 60 and 61.

To this aim, as shown in FIGS. 6, 10, and 15, the aforementioned catch elements 96 are provided on a small disc 122 which is biased downward by means of a leaf spring 121 and which is locked against rotation in reference to the first disc 60 by means of coupling parts 123 and 124. Hereby, the catch elements 96 show a catch surface 125 and an inclined surface 126.

As shown in FIGS. 12 and 16, the catch elements 97 are provided at the top side of the second disc 61 and also show a catch surface 127 and an inclined side 128 each.

These catch elements 96 and 97 are mutually placed in such a manner that the small disc 122 provides for a carry-along effect in the forward sense of rotation from the moment that the catch surfaces 125 and 127 come into mutual contact, however, in the opposite sense of rotation, a mutual free rotation remains always possible because the inclined sides 126 and 128 provide for lifting the small disc 122 when the catch elements 96 and 97 come into contact with each other, as a result of which the small disc 122 is not hindered in its rotational movement.

As shown in FIG. 17, the aforementioned servo valves 48 and 49 substantially consist of openings 129 and 130 which are closed off by means of the rotation of the second disc 61, in function of the position of this disc 61, respectively can be opened and put into an open connection with a chamber 131 wherein water under supply pressure is contained.

As shown in FIG. 17, hereby use is made of valve seals 132–133 which are formed of an elastic material which, by means of its resilience, guarantees for a sealing against the bottom side of disc 61. More particularly, these valve seals consist of O-rings 134–135 which are provided in seats 136–137 around the openings 129–130.

As shown in FIGS. 10, 13, and 17, the closing-off surface 138 of disc 61, at the places where a sealing has to be realized, is provided with enlargements 139–140.

At the places where no sealing has to be realized, grooves 141–142 are provided which allow for the pressure from chamber 131 to easily propagate up to the openings 129–130.

The closing force of the servo valves is assisted by means of a spring 143.

The valves 32, 35 and 47 consist, as represented in the FIGS. 18 and 19, for example of spring-biased membrane valves which can be actuated via the first, servo valve 48. The third valve 40 is a spring-biased membrane valve which can be actuated via the second servo valve 49, and the fourth valve 44 consists of a membrane valve which is controlled by the pressure drop over the third valve 40.

As represented in FIG. 18, the first valve 32 substantially consists of a membrane 144 which, at its closing side 145, cooperates with an inlet channel 146 and which, by its displacement, may or may not provide in a connection between this inlet channel 146 and the top side of reservoir 52.

At the back side 147, the membrane is biased by a pressure prevailing in a pressure chamber 148 which, via channels 149–150–151–152, is in connection with the aforementioned opening 129. At the same time, membrane 144, at the back side, is biased with a minimal force by the pressure of a lock spring 153.

As shown in FIGS. 20 and 21, the channel 150 is formed of a substantially horizontal recess. Channel 151 is formed by an upward extending bore.

The second valve 35 substantially consists of a valve body 154 which cooperates with a membrane part 155. The valve body 154 provides for the closing off of a passage 156 which forms a connection between the head of the treatment tank 28 and a channel 157 which leads to the drain 34. The valve body 154 is pressed against the membrane part 155 by means of a pressure spring 158.

The back side 159 of the membrane part 155 is also biased by the pressure which prevails in the aforementioned pressure chamber 148, as well as by the pressure executed by a pressure spring 160.

Hereby, it is noted that the second valve 35 is designed in such a way that it forms an overpressure safety element.

As shown in FIG. 18, the aforementioned regulating element 36 is formed by an exchangeable part which is placed between channel 157 and the drain 34, having a narrowed passage 161 functioning as a flow-limiting element.

In order to relieve pressure chamber 148 at the moments when no pressure is applied via servo valve 48, channel 150, as shown in FIG. 22, is connected to the aforementioned channel 157 via a relief opening 162 and a channel 163.

As shown in FIG. 19, the third valve 40 is formed by a membrane 164 cooperating with a channel 165 which is connected to the upper extremity of conduit 55, in such a manner that, by means of the displacement of this membrane 164, a connection may or may not be formed between the channel 165 and a space 166 into which the inlet of the volumeter 23 gives out.

At the back side 167, the membrane 164 is biased by a spring 168 and a pressure prevailing in a pressure chamber 169 which, via channels 170–171–172–173, is connected to the opening 130 of said servo valve 49.

In order to relieve the pressure chamber 169 at the time when no pressurization is carried out by the servo valve 49, the channel 171, as represented in FIG. 23, is connected to the aforementioned channel 157 via a relief opening 174 and a channel 175.

The fourth valve 44 substantially consists of a membrane 176 with which a passage 177 can be closed between, on one hand, a channel 178 establishing a connection between space 166 and, on the other hand, a connection part 179 to which, as schematically represented in FIG. 2, a brining device 43 can be connected.

Hereby, the membrane 176, at its front side 180, is biased by the pressure prevailing in the channel 178, and at the reverse side 181, via a connection 182, by the pressure prevailing in the passage 165, as well as by a pressure delivered by a pressure spring 183, in such a way that this fourth valve 44 is controlled by the pressure drop prevailing over the third valve 40.

According to an alternative, the fourth valve 44 can be controlled by the pressure drop over another element, e.g. over the regulation element 36.

The outlet of volumeter 23 is connected to an outlet channel 185 via a space 184.

The aforementioned chamber 131 is set under pressure via a branch conduit from space 166 which is formed by a channel 186.

At channel 150, as represented in FIG. 21, an outlet 187 is provided via which an external pressure signal 188 can be provided. This outlet is closed off when not used.

The fifth valve 47 is outside of apparatus 57 and consists, as schematically represented in FIG. 3, of a passage 190 which is closed off by means of a valve body 189. Hereby, the valve body 189 can be pushed into an open position by means of a membrane 191 upon which, at the back side, a pressure is exerted via a chamber 192 which, via a conduit 193, is connected to the aforementioned outlet 187.

The aforementioned mechanism 94 preferably consists of an element which can be displaced to and fro by means of a drive element and which can push the second disc 61 out of the inoperative position.

In the represented example, this displaceable element is formed by the already mentioned pawl 93.

As represented in the FIGS. 6, 8, and 9, the drive element preferably consists of a plunger 193 which can be shifted between two positions, with substantially four active pressure surfaces, namely a first pressure surface 194 upon which the supply pressure, prevailing in the chamber 131, is acting, a second pressure surface 195 which is larger than the first and upon which also the supply pressure is acting, but opposed to the pressure upon the first pressure surface 194, a third pressure surface 196 upon which the atmospheric pressure exerts a force which is opposed to the force which is exerted upon the first pressure surface 194 by the supply pressure, and a fourth pressure surface 197 upon which a control pressure can be applied, via an inlet 198, working opposed to the supply pressure exerted upon the second pressure surface 195, such, that a pulse shaped control signal 199 results in a to-movement at the upward slope 200A and in a fro-movement at the downward slope 200B of the pulse concerned.

The functioning of the device 1, and more particularly of the apparatus 57, is described hereafter referring to the FIGS. 24 to 36.

During a service cycle, the second disc 61 is in a position as shown in FIG. 24, wherein the ratchet drive mechanism 85 is inoperative, as the pawl 87 is in contact with the toothless part 95. In this position, as shown in FIG. 25, the openings 129–130 of both servo valves 48–49 are closed off by means of the enlargements 139–140.

At the beginning of the service cycle, the first disc 60 is in the reset position, as shown in FIG. 26, wherein the abutment element 108 is in contact with the stop 109. The first disc 60 is driven continuously by means of the ratchet drive mechanism 62, as shown in FIG. 27.

During service, due to the fact that both servo valves 48–49 are closed, the valves 32–35–40–44–47 are in positions as represented in FIG. 28, resulting in a flow path of the water as indicated by the arrows. Hereby, the water is brought into contact with the treatment medium 29. The volumeter 23 is rotating with the first rotational sense R1, resulting in the continuous drive of said first disc 60, as mentioned above.

As shown in FIG. 29, as a result of the rotation of disc 60, the abutment element 108 moves away from the stop 109, and the elastic element 100 is tensioned. After a certain volume of water has passed the volumeter 23, the discs 60 and 122 attain a position, as shown in FIG. 30, wherein the catch elements 96 of the disc 122 contact the catch elements 97 of the second disc 61, as a result of which the second disc 61 is driven along with the first disc 60.

Due to the rotational movement of the second disc 61, the pawl 87 will act upon the toothing 88, which means that the ratchet drive mechanism 85 becomes operative.

In a first step, the enlargements 139–140 attain a position as shown in FIG. 31, in which the first servo valve 48 is opened, however, the second servo valve 49 remains closed. As a result thereof, chambers 148 and 192 become pressurized and valve 32 is closed, whilst valves 35 and 47 are opened, resulting in a flow path as shown in FIG. 32. Hereby, the water is sent in opposite direction through the treatment medium 29, providing in a backwash action.

In a further step, the enlargements 139–140 attain a position as shown in FIG. 33 in which both servo valves 48–49 are opened. As a result thereof, chamber 169, too, is pressurized and, as shown in FIG. 34, the third valve 40 closes. Due to the pressure drop over this third valve 40, the fourth valve 44 opens. As a final result, the water is flowing through the brining device 43, providing that an amount of brine is directed towards the treatment tank 28, and then is guided towards the drain outlet 34. Hereby, the treatment medium 29 is regenerated.

The regulation element 36 provides in a moderate flow, ensuring that the contact between the regeneration medium 42 and the treatment medium 29 is sufficiently long in order to perform a complete regeneration.

After some time, the second disc 61 comes into a position as shown in FIG. 35. Hereby, the pawls 64 and 84 are pushed aside by means of the contact lips 104–105 acting upon the pins 106–107. As a result, the first disc 60 is rotated back into its starting position, namely the position of FIG. 26, by means of the elastic element 100. This action can in fact be carried out at any moment of the regeneration cycle.

In a further step, the enlargements 139–140 attain the position shown in FIG. 36, as a result of which the second servo valve 49 is closed. Hereby, the valves 32–35–40–44–47 arrive in a position similar to that of FIG. 32, providing in a backwash for the removal of salt residues from the treatment medium 29.

Finally, the enlargements 139–140 arrive in a position similar to that of FIG. 25, and the second disc 61 arrives in an inoperative condition, awaiting the next regeneration start.

As the valve body 154 is not connected to the membrane part 155, the second valve 35 opens automatically each time an abnormal overpressure occurs. In this way, the content of the treatment tank 28 is protected against possible damages due to overpressure.

From the aforegoing and from the drawings, it is clear that during each regeneration cycle the second disc 61 is rotated over an angle of only 180°, because in the example shown in the drawings said disc 61 is provided with two programs. For this reason, the disc 61 is provided with two enlargements 139, as well as two enlargements 140. Of course, according to an alternative not shown in the drawings, the disc 61 may also be provided with only one or more than two programs.

The regulator 59 can optionally be equipped with means which allow for a manual start of the second monitoring mechanism 25 and, thus, of the regeneration cycle.

Such means, which are represented in FIG. 5, may consist of a mechanic pushing/turning element 201 or similar with which the second disc 61 can be pushed out of its inoperative position.

The aforementioned brining device 43 can be of any kind. To this end, a known device can be applied. However, it is recommended that a brining device 43 is applied as described hereafter with reference to the FIGS. 37 to 48, as it contributes to the optimalization of the whole treatment device.

As represented in FIG. 37, the brining device 43 substantially consists of a reservoir 202 wherein the aforementioned regeneration medium 42, in this case brine, is present and, optionally, is produced, and of a dosing system 203.

The particularity of this brining device 43 consists in the fact that this dosing system 203 is equipped with a hydraulically driven, volumetric dosing element 204 for dosing of the aforementioned regeneration medium 42, i.e., the brine.

Hereby, the dosing element 204 preferably consists of a pump element 206, in the form of a membrane provided in a chamber 205, which defines at one side 207 a first compartment 208 which is or can be connected, via at least one suction valve 209, to the reservoir 202 and, via at least one pressing valve 210, with the outlet 38 of the treatment tank 28 and which, at its other side 211, defines a second compartment 212 in which a hydraulic pressure can be created via a supply conduit 213.

As represented for various positions in the FIGS. 38, 39, 40, and 41, the pump element 206, in a practical form of embodiment, consists of a pouch of an elastic material within chamber 205, which is preferably limited by a tubular housing 214, whereby the second compartment 212 then is formed by the interior of this pouch.

The pouch is stretched open around a support 215 which also in the shrunk condition, in other words, the condition of FIG. 39, provides for a pre-tension. This support 215 consists of a plate extending into the pouch, whereby the pouch is clamped around one extremity 216 of the support 215, whilst support 215, at this extremity 216, is provided with passages 217 extending upon some distance from this extremity downward such, that via these passages 217 and a connection 218 water can flow into the pouch.

In a practical form of embodiment, as represented in the FIGS. 38 and 40, the suction opening 219 which gives out to the first compartment 208 is provided in the lower end 220 of the housing 214. In this lower end 220, also the suction valves 209 concerned are mounted. When the chamber 205, pump element 206 and support are oriented as illustrated in the figures, and when the tubular housing 214 is placed in the reservoir 202, brine is sucked from the lowest part of reservoir 202, where the highest salt concentration prevails.

The outlet opening 221, which is connected to the first compartment 208, is preferably provided in the upper end 222 of the housing 214. In this end 222, also the pressing valves 210 are mounted.

It is noticed that the volume that can be expelled of the first compartment 208 preferably is smaller than the volume of the intermediate space which is present in between the treatment medium 29, more particularly the resin, in the treatment tank 28, enlarged with the volume of the space in the lower part 56 of the treatment tank 28 and the contents of the conduit running from the outlet of the dosing chamber 205 up to the aforementioned lower part 56.

Over the dosing element 204, an overpressure valve 223 is placed, the closing element 224 of which is biased in such a way, for example, by means of a spring 225, that the overpressure valve 223 only opens when the pump element 206 has arrived in the pushed-out position for the brine.

Parallel over the overpressure valve 223, a mixing passage 226 for the addition of water to the brine is provided. As represented in the practical form of embodiment of FIG. 42, this mixing passage 226 is preferably integrated into the overpressure valve 223, for example, by forming to this aim a leak channel in the closing element 224.

As shown in FIG. 37, the second compartment 212 is constructed in such a way that it also functions as a dosing chamber for the addition of water in the reservoir 202, such that, as this water comes into contact with the salt 227 which is present in this reservoir 202, new brine is produced. The water supply is hereby performed via the schematically represented conduit 228, in which a float mechanism 229 can be provided in order to send an eventual water surplus to an overflow 230.

In order to enable an optimum dosing of the brine, as of the water, between an inlet 231, connecting to the supply conduit 213, the chamber 205, and the reservoir 202 a hydraulically controlled switching system 232 is provided which, by supplying medium under pressure from inlet 231, realizes a connection between inlet 231 and the second compartment 212, but closes the supply to the reservoir 202, whilst this, in the absence of a supply pressure at the inlet 231, realizes a connection between the second compartment 212 and the reservoir 202.

The switching system 232 preferably consists of a membrane valve 233 the membrane 234 of which cooperates with a passage 235 which is connected to the reservoir 202, in other words, the brine reservoir. The membrane 234 hereby is biased by a pressure in a chamber 236 which is connected to the aforementioned inlet 231. Via conduit 228, the second compartment 212 is connected to the bottom side 237 of the membrane 234 in such a way that the membrane 234 in biased condition does not allow for a connection of this to the passage 235.

Between the inlet 231 and the second compartment 212 there is also a connection, in the shape of a narrowing 238.

In a practical form of embodiment which is represented in the FIGS. 43 to 46, the float mechanism 229 and the switching system 232 are arranged in a housing 239 and the narrowing 238 is integrated into the membrane 234. More particularly, this narrowing 238 is formed by an opening 240 in the membrane 234 and a circular channel 241, provided under the membrane 234, to which conduit 228 is connected via an opening 242. The location of the openings 240 and 242 is such that they are not in each others elongation.

The float mechanism 229 is substantially formed by a float 243 which floats in the housing 239 in the fluid of the reservoir 202 and which cooperates with a closing valve 244. This closing valve 244 forms a passage between a chamber 245 into which the said passage 235 gives out. To this chamber 245, the said overflow 230 is connected. The closing valve 244 operates in such a way that, from the moment that the level in the reservoir 202 has reached a well-defined height, this valve is closed, as a result of which the residual water is forced to flow off via the overflow 230.

The chamber 245 is also provided with a number of openings 246 forming a direct connection to the upper part of the reservoir 202 and forming a safety for the case that the level in the reservoir 202 should rise abnormally, for example due to a damage.

The working of the brining device 43 is described hereafter with reference to the two schematic illustrations represented in the FIGS. 37 and 47.

At the moment when the water treatment device is in service, the valve 44 from FIG. 2 is closed and the inlet 231 is pressure-free. Due to the pre-tension in the pump element 206, more particularly the membrane applied therefore, a well-defined quantity of treatment medium 42 is suctioned in the first compartment 208.

During regeneration, as mentioned before, the valve 44 is opened. As a result of this, the inlet 231 is pressurized.

The membrane 234 bulges downward and closes off the passage 235.

The water which is supplied via supply conduit 213, under the influence of the prevailing pressure difference, also flows through opening 238 into the second compartment 212 of the chamber 205, as a result of which the pump element 206 is displaced and, as represented in FIG. 47, the quantity of treatment medium 42, in this case brine, which is present in the first compartment 208, is pressed via pressing valve 210 towards the outlet 38 of the treatment tank 28.

During this movement, also a well-defined quantity of water flows through the mixing passage 226, as a result of which a well-defined dilution is achieved.

From the moment that the membrane has bulged completely, the pressure drop over the overpressure valve 223 becomes that large that the latter opens and a rinsing effect is created. Due to the fact that the water has to pass through the opening 240, which acts as a flow controller, the rinse flow rate is controlled, ensuring the desired contact time. The controlled flow rate ensures that the brine which is dispensed by the dosing chamber 205 is slowly pushed forward through the treatment medium 29, i.e. the resin.

As soon as the brining device 43 is closed off from the supply pressure, i.e. when the aforementioned fourth valve 44 is closed, the membrane valve 233 opens and, by the resiliency of the pump element 206, the water of the second compartment 212 is pressed over connection 228 towards the passage 235 through which it comes into the brine reservoir 202. In the meantime, another well-defined quantity of brine is sucked into the first compartment 208, ready for the next regeneration cycle.

Preferably, provisions are made providing for the volume of brine which is expelled from the dosing chamber 205 being smaller than the volume of water subsequently sent to the brine reservoir 202, offering the advantage that a constant level in the brine reservoir 202 is maintained, even when evaporation occurs. These provisions can be of various nature. According to a first possibility, a surface difference will be created between the two wall sides dividing the dosing chamber 205 into the said compartments 208–212. According to another possibility, an intended leak towards the brine reservoir will be provided. According to still another possibility, a hydraulic switching system 232 will be used, having a relatively large closing inertness, so that, apart of the water delivered by the second compartment 212, still a further small amount of water is delivered directly from the inlet 231.

As soon as the liquid in the brine reservoir 202 surpasses a certain level, the closing valve 244 is closed and the surplus water is led towards the spillway 230.

The narrowing 238 in FIG. 37 may, instead of said opening 240, also be formed by means of an element, the passage of which is adjustable, allowing to adjust the flow speed during brining and rinsing.

FIG. 48 shows a variant in which the dosing of fresh water into the brine reservoir 202 is obtained by means of a passage element 247, providing in a small permanent flow of water towards the reservoir 202, as long as water is supplied at the inlet 231.

In other applications, the above described device 43 can also be used as a supply device for other regeneration mediums than brine. In case that the reservoir 202 has not to be refilled by water, the water expelled from the second compartment 212 can be directed immediately towards a drain.

The water treatment device according to the invention is optimally apt to be built out for a larger capacity.

In that case, according to a particular form of embodiment of the invention, which is shown in FIG. 49, the device is characterized in that it comprises two or more parallel working treatment tanks 28A–28B–28C which each are equipped with a regulator 59A–59B–59C; in that the regulator 59A of the first treatment tank 28A is equipped with a first hydraulically driven monitoring mechanism 24A for starting the regeneration of this treatment tank 28A after a well-defined volume of water has flown therethrough, a second hydraulically driven monitoring mechanism 25A for controlling the regeneration cycle, and means which generate a hydraulic signal 248 at the end of the regeneration cycle of the first treatment tank 28A; in that the regulators 59B–59C of all subsequent treatment tanks 28B–28C are at least equipped with a hydraulically driven monitoring mechanism 25B–25C for controlling their own regeneration, with means for starting, after receipt of a hydraulic pressure signal 248–249, their own regeneration, and with means which deliver a hydraulic signal 249 at the end of the corresponding regeneration cycle, with exception of the last treatment tank 28C which does not necessarily have these latter means; and in that the various regulators 59A–59B–59C are mutually coupled in such a way that each regulator 59B–59C, with exception of the regulator 59A of the first treatment tank 28A, receives a pressure signal 248–249 for starting the regeneration, each time the regeneration cycle of the preceding regeneration tank 28A–28B is finished. The sequence of the regeneration cycles of the three devices, which in fact corresponds to the sequence of the pressure pulses P at the servo valves 48 of the respective regulators 59A–59B–59C, is shown in FIG. 50 in function of time t. Of course, a time delay may be provided between subsequent regeneration cycles.

One or more of the tanks 28A–28B–28C may also consist of a group of simultaneously working tanks.

Preferably, the signal which opens or closes the first valve 32 of the previous tank, i.e. the signal delivered by the first servo valve 48, is used to start the regeneration cycle of the next tank. In this way, the means for starting the regeneration of each subsequent tank are formed by the first servo valve 48 of the regulator of the previous tank.

The means for starting the regeneration of the second and subsequent tanks preferably consist of mechanisms 94 as described before. Hereby, the outlet 187 of the regulator 59A of the first tank 28A is connected to the inlet 198 at the regulator 59B of the second tank 28B, and the outlet 187 of the regulator 59B of the second tank 28B is connected to the inlet 198 at the regulator 59C of the third tank 28C.

Such mechanism 94 functions as follows. Upon pressurizing the opening 129 of the first servo valve 48 of the first regulator 59A, the plunger 193 at the second regulator 59B is shifted into the direction F, as shown in FIG. 9. Upon depressurizing the opening 129, the plunger 193 is shifted into direction G, resulting in that the disc 61 is brought out of its inoperative position by means of pawl 93 and in that the regeneration cycle of the second apparatus 57 is started. A similar action occurs later on between the second and third apparatuses 57. Hereby, it should be noted that the specific construction of mechanisms 94 offers the advantage that their functioning is not sensitive to interruptions in the supply pressure.

The regulators 59B and 59C may or may not be equipped with a first monitoring mechanism 24.

Preferably, the water treatment tanks 28–28A–28B–28C and the pertaining regulators 59–59A–59B–59C are designed in a modular manner, in other words, such, that the treatment capacity can be enhanced exclusively by coupling of such modules whereby the extension allows the mounting of an even or uneven number of treatment tanks 28–28A–28B–28C.

Finally, hereafter, another particular form of embodiment of the regulator 59 is described by means of FIGS. 51 to 58, whereby, as mentioned in the introduction, use is made of a gearwheel drive with gearwheels which are placed upon pivotable arms.

In the specific case of the embodiment of FIGS. 51 to 58, use is made of two pivotable arms 250 and 251 which can be pivoted freely around shafts 252 and 253. As indicated schematically, each of these shafts 252–253 is driven by means of the volumeter 23, for example, by means of gearwheel transmissions. Hereby, the shafts 252 and 253 rotate in the same sense of rotation in respect to each other. The shaft 252, however, rotates considerably slower than the shaft 253.

On the shafts 252–253, gearwheels 254–255 are attached.

Furthermore, on the pivotable arm 250 a gearwheel 256 is mounted which permanently engages into the gearwheel 254 and which, by turning the pivotable arm 250, is movable at least between two positions, respectively one position whereby this gearwheel 256 engages into a toothing 257 which is provided at the circumference of the disc 60, and a position whereby the gearwheel 256 is at a distance to this toothing 257.

At the pivotable arm 251, on opposite sides of the gearwheel 255, gearwheels, 258 and 259 respectively, are mounted which both cooperate with the gearwheel 255. By means of turning the pivotable arm 251 in one direction, the gearwheel 258 is forced to a toothing 260 which is provided at the circumference of the disc 61, whereas, as it is turned in the other direction, the gearwheel 259 cooperates with the toothing 260, in this case via an intermediate gearwheel 261.

The regulator 59 of the figures is further provided with means which are active between the first disc 60 and the second disc 61 in order to move the second disc 61, at a well-defined mutual position of the two discs 60–61, out of an inoperative position. In the shown example, these means consist of, on one hand, a guidance 262 which is attached to the disc 60, for example, is manufactured in one piece therewith, and which is provided with a recess 263, and, on the other hand, a part 264 formed at the pivotable arm 251, for example, in the shape of a cam follower, which can make contact with the guidance 262, in such a manner that the gearwheel 258 exclusively can engage into the toothing 260 when the part 264 is situated in the recess 263.

The regulator 59 is also provided with means which guarantee that the drive of the disc 60 is interrupted in a well-defined position, which means in this case consist of a toothless portion 265 in the toothing 257.

Furthermore, the regulator 59 is also provided with reset means which allow that, analogous to the form of embodiment of FIG. 5, the disc 60, with each regeneration, is returned into a starting position. These reset means consist of a reset spring 266, more particularly a torsion spring, which is fixed between the disc 60, more particularly at a coupling part 267 formed to this end, and an element 268.

The reset means also comprise abutments 269 and 270, at the disc 60 and the element 268 respectively, which determine the starting position of the disc 60.

Furthermore, the reset means also comprise de-activation elements 271 in form of protrusions which are provided at the second disc 61. These protrusions are of such a kind that they come into contact with the pivotable arm 250 during their rotation, in such a manner that the gearwheel 256 provided at this latter is forced to leave the toothing 257.

It is noted that in the embodiment of FIGS. 51 to 58, the regeneration disc, in other words, the disc 61, per rotation provides for three regeneration cycles and, as a result of this, also comprises three enlargements 139, as well as three enlargements 140, as is clearly visible in FIG. 53.

As is also clearly visible in FIG. 53, recesses 274 and 275 are provided in the toothing 260, respectively at the places where the gearwheels 258 and 261 engage, the purpose of which shall become clear from the following description.

Analogous to the form of embodiment of FIG. 5, the regulator 59 comprises externally operable regulation means with which the start of the regeneration cycle can be regulated in function of the treated quantity of water. In the example of FIG. 51, these regulation means are formed by the element 268 which, to this end, is turnable in such a manner that the abutment 270 can be adjusted in different positions. The turning of the element 268 takes place by means of an operating member 272 in the shape of a turnable spindle with which, by means of a gearwheel transmission 273, the element 268 can be adjusted.

The functioning of the regulator 59 is described in the following in reference to FIGS. 54 to 58.

FIG. 54 shows the condition of service. Due to the fact that the shafts 252 and 253 are driven in the indicated directions, the gearwheels 256 and 258 are forced into the direction of the toothings 257–260. Hereby, the gearwheel 256 engages into the toothing 257, as a result of which the disc 60 is driven. The portion 264, however, comes into contact with the guidance 262 which turns together with the disc 60, in such a manner that the engagement of gearwheel 258 in the toothing 260 is prevented.

After a well-defined volume of water has flown through the water treatment device, the condition of FIGS. 55 and 56 is obtained, whereby the regeneration is started. The start is obtained as the recess 263 places itself in front of the portion 264, as a result of which the latter is turned into the recess 263 and as a result of this the gearwheel engages the toothing 260. A short time after this condition has been reached, the toothless portion 265 reaches the gearwheel 256, as a result of which the further rotation of this latter does not have any more influence upon the disc 60.

Figure 57:
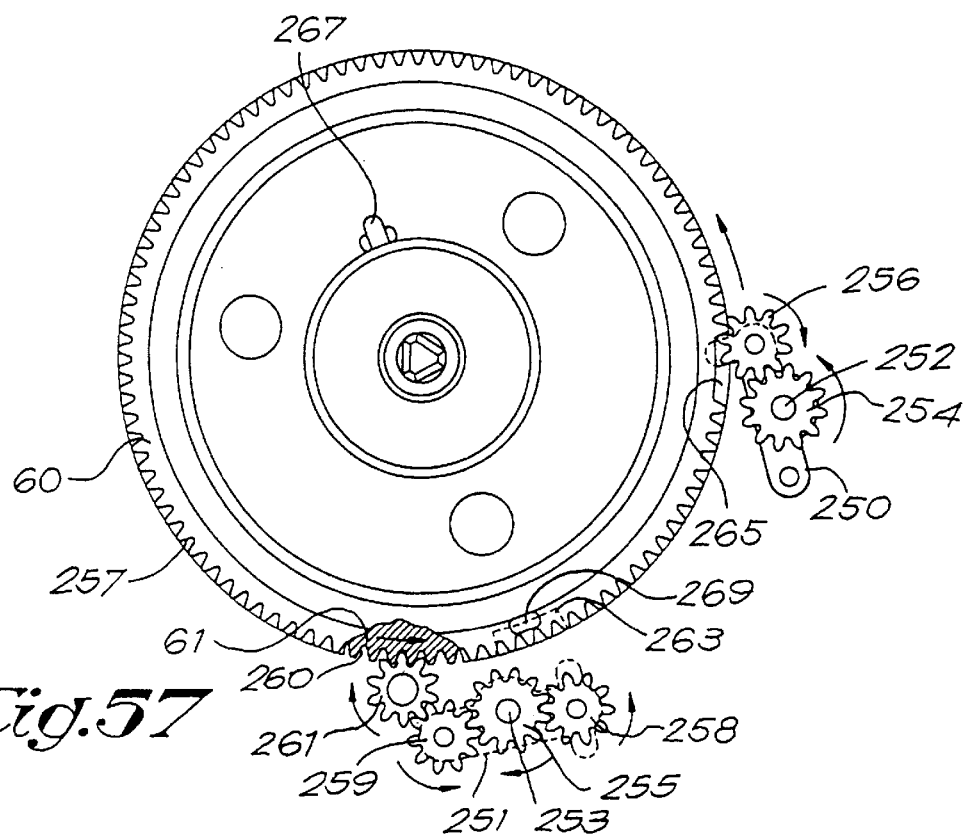

When, during the regeneration, the sense of rotation of the volumeter 23 is reversed, a condition is obtained as shown in FIG. 57. Hereby, the sense of rotation of the shafts 252–253 is reversed. As a result of this, the pivotable arm 251 tilts, due to the carrying effect exerted by the shaft 253, from the position of FIG. 56 into that of FIG. 57, with the result that the disc 61 which provides for the regeneration is driven further in the same sense of rotation.

It is noted that the pivotable arm 250, due to the small carrying effect which is exerted by the shaft 252, has the inclination to remove itself from the toothing 257, but, in the practice, however, is prevented therefrom as the toothing 257 exerts a force onto the gearwheel 256, delivered by the reset spring 266.

Figure 58:
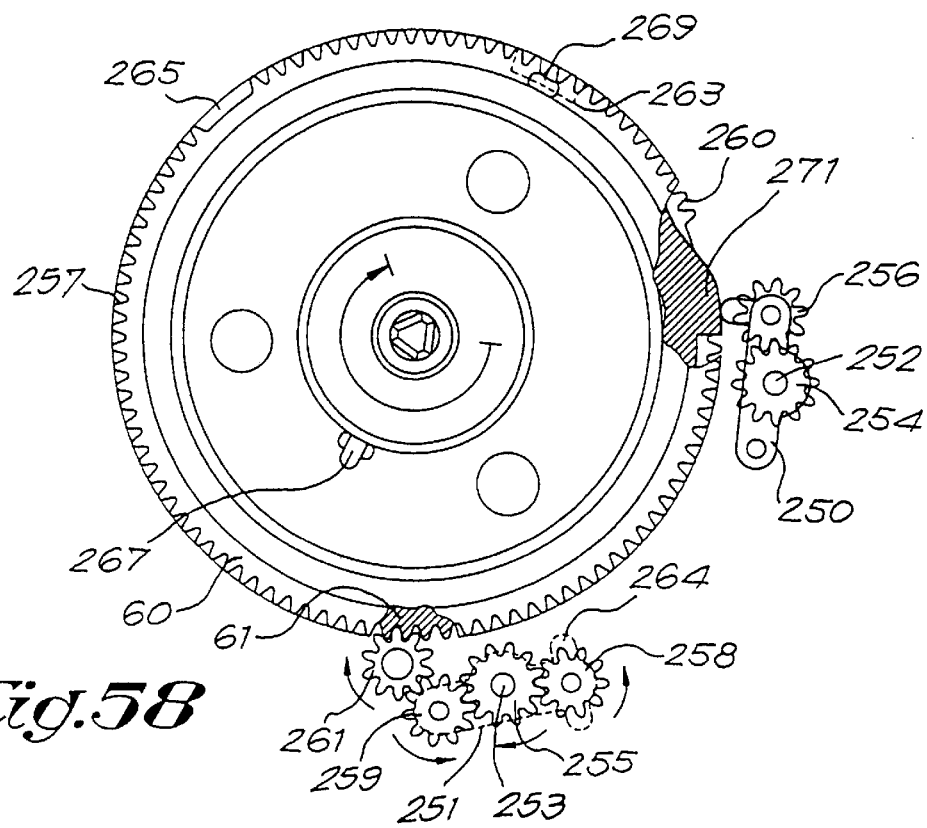

After a well-defined period of time, the pivotable arm 250, as shown in FIG. 58, is pushed away from the toothing 257 by means of the de-activation element 271, in such a manner, that the disc 60, by means of the reset spring 266, is turned back into the starting position, whereby the abutment 269 is placed against the catch 270.

When finally, at the end of the regeneration cycle, the sense of rotation of the volumeter 23 is reversed, a condition of service as shown in FIG. 54 is obtained again.

The recesses 274 and 275 form safety systems which prevent that, during the eventual further rotation of the gearwheels 258 and 261 due to phenomena of inertia in the system, the disc 61 is still driven further.

According to the invention, only one of the discs 60 or 61 can be driven by means of a ratchet drive or gearwheel drive as described before, whereas the other disc is driven in another manner.

The toothings 257–260 do not have to be provided directly on the disc, but can be provided at an element cooperating with the disc concerned.

The invention is in no way limited to the forms of embodiment, given by way of example only and represented in the accompanying drawings, such treatment device, however, can be constructed in various manners without deviating from the scope of the invention.

What is claimed is:

1. A water treatment apparatus comprising:
   a regenerable treatment medium (29);
   a regulator (59) provided with a hydraulically driven first monitoring mechanism (24) having a first disc (60), and a hydraulically driven second monitoring mechanism (25) having a second disc (61);
   a single volumeter means (23) for driving both monitoring mechanisms (24–25);
   said first disc (60) of said first monitoring mechanism functioning to control the total amount of water consumption within an operational cycle of said regenerable treatment medium (29) and further functioning to order the start of a regeneration cycle, wherein said operational cycle involves a forward rotation of said first disc (60) from a starting position to a position where said regeneration cycle is ordered;
   said second disc (61) of said second monitoring mechanism (25) functioning as a programming disc for controlling said regeneration cycle; and
   said first monitoring mechanism (24) being further provided with reset means (98) for providing a backwards rotation of said first disc (60) to said starting position each time said regeneration cycle is performed.

2. A water treatment apparatus according to claim 1, characterized in that the volumeter means (23) is operable both during a regeneration cycle, during which the volumeter means is rotatable in a first direction, and during a treatment cycle, during which the volumeter means is rotatable in an opposite direction.

3. A water treatment apparatus according to claim 1, characterized in that the volumeter means (23) consists of a volumetric measuring element.

4. A water treatment apparatus according to claim 1, characterized in that the apparatus is provided with a number of valves (32-35-40-44-47) for controlling flows of water and a regeneration medium (42) between a service condition and a regeneration condition, wherein said valves (32-35-50-44-47) may be operated as a unit by the use of servo valves (48-49) contained within the regulator (59).

5. A water treatment apparatus according to claim 4, characterized in that the regulator (59) comprises only two servo valves (48-49).

6. A water treatment apparatus according to claim 4, characterized in that said number of valves (32-36-40-44-47) are mutually coupled and are controlled as a unit by means of pressure lines (50-51).

7. A water treatment apparatus according to claim 1, characterized in that at least one of both discs (60-61) is driven by means of a gearwheel drive mechanism, whereby this gearwheel drive mechanism uses one or more gearwheels (256-258-259) driven by the volumeter means (23).

8. A water treatment apparatus according to claim 1, characterized in that the regulator (59) comprises externally operational setting means with which the start of the regeneration cycle can be adjusted as a property pf volume of the water to be treated.

9. A water treatment apparatus according to claim 8, characterized in that the adjustment of the setting means can be read externally from a scale expressed in degrees of hardness or in volume of treated water, whereby the scale is connected to the setting means.

10. A water treatment apparatus according to claim 1, characterized in that the regulator (59) is provided with a mechanism (94) which is activated by means of an external hydraulic signal, with which the second monitoring mechanism (25) can be activated.

11. A water treatment apparatus according to claim 10 characterized in that the aforementioned mechanism (94) comprises an element which can be shifted to and fro by means of a drive element and which can push the second monitoring mechanism (25) out of an inoperative position.

12. A water treatment apparatus according to claim 11, characterized in that the drive element consists of a plunger (193).

13. A water treatment apparatus according to claim 1, characterized in that the regulator (59) is provided with means (201) for manually starting said second monitoring mechanism (25) and, thus, the regeneration cycle.

14. A water treatment apparatus according to claim 1, characterized in that the treatment medium (29) is formed of a resin which is provided in a treatment tank (28).

* * * * *